(12) United States Patent
Balasubramanian et al.

(10) Patent No.: US 9,639,855 B2
(45) Date of Patent: May 2, 2017

(54) DYNAMIC EMBEDDED RECOGNIZER AND PRELOADING ON CLIENT DEVICES GRAMMARS FOR RECOGNIZING USER INQUIRIES AND RESPONSES

(71) Applicant: Nuance Communications, Inc., Burlington, MA (US)

(72) Inventors: Sundar Balasubramanian, Seattle, WA (US); Michael McSherry, Seattle, WA (US); Eric Jun Fu, Bellevue, WA (US); Daniel Hendrick, Bellevue, WA (US); Deepankar Katyal, Seattle, WA (US); David J. Kay, Seattle, WA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 280 days.

(21) Appl. No.: 14/450,146

(22) Filed: Aug. 1, 2014

(65) Prior Publication Data
US 2015/0379568 A1 Dec. 31, 2015

Related U.S. Application Data

(63) Continuation of application No. 14/316,663, filed on Jun. 26, 2014.

(51) Int. Cl.
*G06F 17/27* (2006.01)
*G06Q 30/02* (2012.01)
(Continued)

(52) U.S. Cl.
CPC ..... *G06Q 30/0255* (2013.01); *G06Q 30/0257* (2013.01); *G06Q 30/0261* (2013.01);
(Continued)

(58) Field of Classification Search
CPC ......... G06Q 30/0255; G06Q 30/0267; G06Q 30/0269; G06Q 30/0257; G06Q 30/0261; H04L 67/2847; G10L 13/033; G10L 15/20
(Continued)

(56) References Cited

U.S. PATENT DOCUMENTS

| 8,438,023 B1 | 5/2013 | Hamilton et al. |
| 8,666,740 B2 | 3/2014 | Lloyd et al. |

(Continued)

OTHER PUBLICATIONS

International Search Report and Written Opinion for International Application PCT/US2015/038153; Applicant Nuance Communications, Inc.; Mail Date Sep. 30, 2015; pp. 12.

*Primary Examiner* — Thierry L Pham
(74) *Attorney, Agent, or Firm* — Perkins Coie LLP

(57) ABSTRACT

A system and with an associated method for preloading advertisements from a server to a user's device is disclosed. In response to inquiries made by members of a user group, user devices of the members present advertisements to the members and the server keeps a record of these presentations. Next, the server identifies those advertisements which have been frequently presented to the members, and preloads the identified advertisements to the device of a user who belongs to the user group. Subsequently, upon receiving a specific inquiry by the user's device, the server determines a response to the specific inquiry. When the determined response contains one of the preloaded advertisements, the server sends an instruction to the user's device to present the preloaded advertisement to the user.

20 Claims, 9 Drawing Sheets

(51) Int. Cl.
*H04L 29/08* (2006.01)
*G10L 13/033* (2013.01)
*G10L 15/20* (2006.01)
*G10L 25/00* (2013.01)

(52) U.S. Cl.
CPC ..... *G06Q 30/0267* (2013.01); *G06Q 30/0269* (2013.01); *G10L 13/033* (2013.01); *G10L 15/20* (2013.01); *H04L 67/2847* (2013.01)

(58) Field of Classification Search
USPC ........................................................ 704/4, 9
See application file for complete search history.

(56) References Cited

U.S. PATENT DOCUMENTS

| | | |
|---|---|---|
| 8,682,659 B2 | 3/2014 | Kristjansson et al. |
| 9,076,454 B2 | 7/2015 | Agapi et al. |
| 2006/0253272 A1 | 11/2006 | Gao et al. |
| 2012/0289147 A1* | 11/2012 | Raleigh ............... H04L 67/2847 455/3.06 |
| 2013/0040694 A1 | 2/2013 | Forutanpour et al. |
| 2013/0144617 A1 | 6/2013 | Murakami et al. |
| 2014/0105412 A1 | 4/2014 | Alves et al. |
| 2015/0379583 A1 | 12/2015 | Balasubramanian et al. |
| 2015/0379981 A1 | 12/2015 | Balasubramanian et al. |
| 2015/0379989 A1 | 12/2015 | Balasubramanian et al. |
| 2016/0078491 A1 | 3/2016 | Kennewick et al. |

\* cited by examiner

DYNAMIC EMBEDDED RECOGNIZER AND PRELOADING ON CLIENT DEVICES GRAMMARS FOR RECOGNIZING USER INQUIRIES AND RESPONSES

CROSS-REFERENCE TO RELATED APPLICATION

This application is a continuation of, and claims the benefit of, U.S. patent application Ser. No. 14/316,663, entitled "VOICE-CONTROLLED INFORMATION EXCHANGE PLATFORM, SUCH AS FOR PROVIDING INFORMATION TO SUPPLEMENT ADVERTISING," filed Jun. 26, 2014, which is incorporated herein by reference in its entirety.

BACKGROUND

An advertisement is effective when an audience heed's its message. The audience may be encouraged to take action or consider an idea. And if the message is persuasive enough, the audience acts as the advertiser desires it to.

Much of the effectiveness of an advertisement lies in its ability to convey information. On radio and television, for example, advertisements for products are played during breaks in programming or included in the programming itself, such as by product placement. And online, advertisements are displayed adjacent to a web page's content or as part of it. These advertisements may convey information by telling a story or offering an opinion or a fact. Through the presentation of its message, advertisers hope to communicate the right information to persuade its audiences to follow a desired course of action.

But often an advertisement is unpersuasive. One common reason for this is that the audience did not learn information relevant to its interests. Some types of advertisements provide avenues for an audience to learn more about a topic of choice. For example, a person actively consuming media content by browsing web pages can select a hyperlink displayed on a website to learn more information about an advertised topic. But when media is consumed more passively, such as through television, radio or any device in the environment, a person might not even know the identity of an item of interest and would typically need to search for more information regarding the item of interest autonomously and strenuously. Doing so is generally cumbersome and inefficient, thus reducing the likelihood that the person receives appropriate informational advertisement and is ultimately persuaded by the advertisement. As a result, many advertisers lose opportunities to persuade audiences that would likely be receptive toward their messages.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
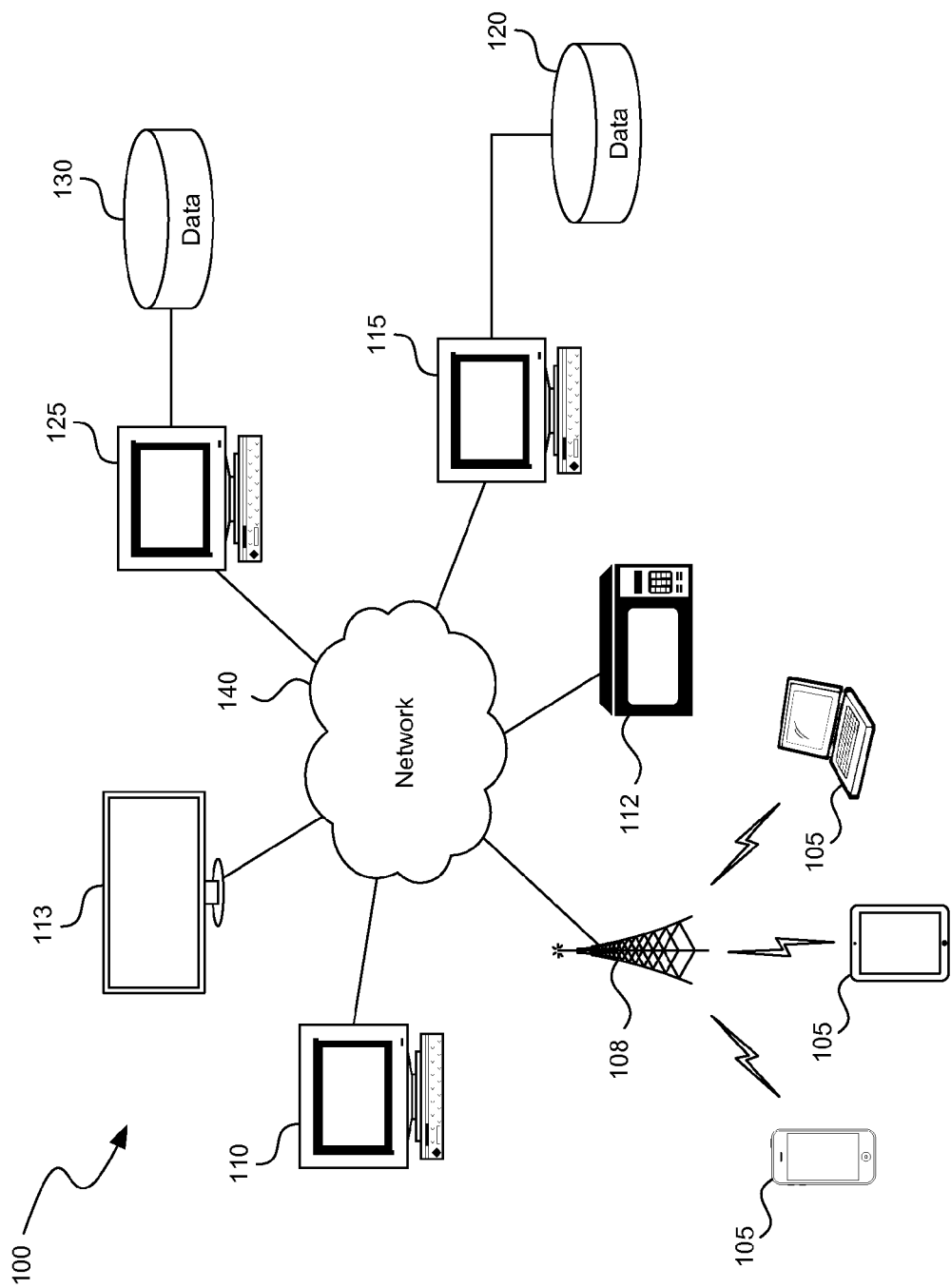
FIG. 1 is a diagram of a suitable environment in which a voice-controlled advertisement platform operates.

A voice-controlled content delivery platform, such as an advertisement platform, will now be described. The voice-controlled advertisement platform, or a portion thereof, is generally deployed on a user-accessible device, such as a television, a cellular phone, a vehicle-mounted device, or a kiosk, which is connected with voice input or recording equipment and capable of outputting multimedia information. The voice-controlled advertisement platform may receive an utterance or voice inquiry from a user regarding certain items of interest she has observed in content or multimedia displayed on the device or anywhere else in the surroundings. In a first example, a user may utter "How much does that cost?" when she sees a jacket on an actor in a show played on a television. In a second example, she may utter "What's on the menu?" when she is driving near a billboard right off the highway that shows an image of a restaurant. Thus, the platform allows advertisers to engage with users in an asynchronous process that does not distract them from the task at hand (e.g. driving, watching a movie, reading the magazine), but ensures that users do not miss out on the opportunity to engage with the advertising or the brand. The platform allows users to obtain additional information when in mental states like driving where they cannot afford the additional cognitive load, or when reading or watching television when they do not want the additional cognitive load at that time.

Advertising and other application-driven scenarios often need anticipated custom grammars, but these grammars increase the "footprint" (data storage and processing requirements), and increase the risk for pattern matching complexities. These custom grammars include custom words, custom phrases, custom sounds, etc. Prior custom grammars were required to be available online, or available off-line in their entirety and fully indexed, such as for media track titles, contact names, etc. As a result, an off-line component would anticipate what applications might be needed in the future and a connection component would assemble required grammars. These custom grammars would have an expiration time that could expire when, for example, an ad campaign expired.

Described in detail below is an improvement whereby a platform, such as a voice-controlled advertising platform, can dynamically request specific speech grammar updates based on the applications it anticipates having to use in the near term, so that the platform allows off-line speech recognition experiences that require no real-time network access, provide low latency recognition, and still provide custom lexicon support. The platform thus enables very complex custom grammars to be assembled in application/context specific chunks entirely server-side (such as for a specific ad campaign), and then pushed down to an off-line component at the user-side—only as needed—without unnecessarily bloating the off-line component, or requiring the off-line/client-side component to do the processor-heavy work of assembling the grammars. As a result, users have a seamless application-specific grammar, such as for an ad campaign, without any live network connectivity, and without having to load all of such grammars beforehand.

The voice-controlled advertising platform provides a server-side interface (website, web application, etc.) that allows an application designer to assemble custom grammars for their application or for the platform. The platform may also assemble its own custom grammars. It may save all user inquiries received from members of a user group and targeted contents presented in response, where a user group can be defined by location, by age, by profession, etc., and analyze them to identify frequently received user inquiries and frequently presented advertisements. Next, the voice-controlled advertisement platform may preload the grammars applicable to the identified user inquiries and the identified advertisements on the device of a member of the user group, when the network load between the server and the member's device is relatively low. When one of the identified user inquiries is subsequently received by the member's device, the inquiry may then be immediately analyzed with one of the preloaded grammars and responded with one of the preloaded advertisements.

On the other hand, when a client-side application (off-line) needs to make use of one of the custom grammars, it may ping the network when network connectivity exists, and provide a set of grammar profiles that it anticipates needing off-line. These profiles may contain links to the grammars, which are managed server side. Each profile typically has a theme, such as "new movie releases" or "dates and times" and is associated with a set of contextual metadata representing various dimensions, as discussed herein. As the profile is linked to specific grammars, the developers of the client-side application need not worry about which words and associated grammars should be stored for specific users or purposes at all times. Therefore, the client-side application need not know anything about the grammars themselves, just the profiles. In response to a request based on a profile, the server then provides these grammars to the client for local storage and off-line use. Through the use of profiles, the platform permits the developer or an application designer to process various contextual metadata like location, application usage history, value of ad campaign, etc. to be captured in the profiles, and the corresponding grammars can be dynamically downloaded to and cached on user devices for offline usage.

For example, if a user is in Seattle, an ad is for the National Football League (NFL), and the designer is targeting the campaign for a male audience in the 20-30 age range, then the client would request from the server one or more profiles related to Seattle-based grammars, NFL grammars and age/gender-based grammars. Some of the metadata that the client sends to the server includes items or data like location, age, gender, etc. The server receives the metadata and identifies appropriate grammars from a library or database of grammars that correspond to these metadata—in the form of profiles—that the server then sends back to the client. The client caches the received grammars for later offline usage. In this case, the NFL grammar may include team names, with a higher priority for Seattle team names and Seattle player names, while the male 20-30 age grammar may include a speech recognizer that handles audience/user responses tuned to younger male acoustical models. (The terms "grammars" and "profiles" may at times be used interchangeably herein.)

As discussed above, the voice-controlled advertisement platform may receive a spoken command from a user while she's driving, watching TV, reading this magazine, etc., such as "more info", or any derivative of this command, like "more information", "tell me more", "how much is it?", "Does it do X?", etc. In the first example presented above, a user may utter "How much does that cost?" when she sees a jacket on an actor in a show played on a television. In a second example presented above, she may utter "What's on the menu?" when she is driving near a billboard right off the highway that shows an image of a restaurant. This can happen by pressing a steering wheel button in a vehicle, selecting a button on a mobile device or remote control unit, using a wake-up word such as "Dragon, tell me more", or any other method to initiate the audio capture. In response, the platform gathers contextual and other information to infer the user's most likely candidate of interest. This contextual/other information can include the station user is listening to/watching, the user's GPS coordinates, a picture of advertisement they're looking at or the audio sample of the advertisement, etc. The platform thus identifies the sources of the items of interest. One source is the multimedia displayed on or provided by the user device on which the voice-controlled advertisement platform is deployed, such as the television in the first example, which might be regular programming that is independent of the voice-controlled advertisement platform or advertisement presented by the platform. Another source is any multimedia that can be observed in the user's surroundings, such as the billboard in the second example.

Upon identifying the sources, the voice-controlled advertisement platform may determine the items of interest, such as the jacket with pricing information in the first example and the restaurant with menu information in the second example, based on data indicating the user's general preferences, including basic demographic information and a history of interacting with the platform. Upon determining the items of interest, the voice-controlled advertisement platform may then present more information related to the items of interest in response to the user's voice inquiry. Thus, using a series of metadata from the audio sample of the user's utterance the system infers the most likely candidate of interest and can provide additional information to the user via e-mail, text, physical mail, social network update, or other asynchronous method.

As one example, the user's utterance may include certain words and/or an audio profile such as including profanity or nasal tones. The system may use this data to deduce a user's emotion or sentiment, such as contempt or sarcasm, to further disambiguate the user's intent. For example, the system may analyze the received utterance and compare recognized words to a dictionary having certain words flagged with an associated emotion or sentiment, and thereby infer that the user is, e.g. angry based on use of profanity, particularly if the system has not previously recognized frequent use of profanity by this user. Further, the system can compare an audio profile for the user, such as a level or tempo of the user's utterance to a baseline profile for the user to determine a faster, higher pitched and/or louder utterance, further indicating an angry emotion for that user. By recognizing users emotion or sentiment, the system can then provide inferred data, such as delivering content that is "opposite" to currently perceived content if the system receives user's sentiment to be angry. For example, if the system detects context information in the user's environment related to a political candidate, and the system detects that the user is angry, then the system delivers an ad related to the opposing political candidate.

As another example, the audio sample may include background music. The system may then use this type of data to identify not only information regarding the music (e.g. the performer or artist of the song), but also identify further information on what may appeal to the user's interest. For example, by recognizing that the background music often includes Opera music, and understanding from demographic data that listeners of Opera music are often highly educated and interested in the arts, then the system may provide to the user ads or other information related to local cultural events, lectures at nearby universities, and so forth.

As yet another example, a voice signature may be derived from the audio sample. For example, after providing information regarding a new jacket that the user inquired about, the user can automatically purchase the jacket using the audio/voice interface, whereby that purchase is automatically conducted by verifying the user's identity with voice biometric authentication. Overall, such rich, targeted content tends to be highly relevant to a user's interests without inconveniencing the user and thus highly engaging to the user.

Unfortunately, there's often significant background noise present when receiving the audio sample from a user. It just requires a significant amount of processing work to filter out the background noise and apply the correct acoustical model to extract the "speech" from the "noise". Thus, the voice-controlled advertisement platform may also establish noise signatures to increase the accuracy of recognizing a user's voice inquiry and the quality of a response to the voice inquiry. It may crowd-source noise samples from different users in the same location for different types of environments, such as a quiet room, a sports complex, a moving car, etc. The voice-controlled advertisement platform may accept voluntary submissions of noise samples, so that users would opt in for this service on a voluntary basis, knowing that as they opt-in, they also benefit from improved performance from the system—. Alternatively or additionally, it may automatically and periodically collect background noise data by periodically sampling the background noise, extending a regular recording of a voice inquiry to also record the background sound alone, etc. It may then compute noise signatures for the various types of environments based on the noise samples and continue to refine the noise signatures as additional noise samples become available. Next, the voice-controlled advertisement platform may use the noise signatures to estimate the current noise level for a particular environment based on knowledge of the current noise level at a given location (or, if acceptable, use the noise signature when no knowledge of the current noise level is available). As a result, it may isolate the noise from a recording of a user's voice inquiry in the particular environment, or adjust the voice used in a response to a user's voice inquiry to account for the current noise level in the particular environment.

Device manufacturers, such as mobile phone makers, can offer such a noise sampling feature as a background application built into the device, to thus increase the quality of voice input for users of the device. This background application would periodically or sporadically sample background audio, and transmit that audio, along with a location (e.g. GPS coordinates) and timestamp, to network servers. The servers would then normalize all the audio files it received for the same location to establish a consistent "background" noise level for that location. Mobile devices could be timed such that they all report back samples at intermittent frequencies, thereby ensuring that a relatively recent sample is always available to the network servers. If the most recent sample is too old or not current, then a later received audio file for that location would be processed as normal, without the benefit of this sampling feature. Overall, this feature of the voice-controlled advertising platform would allow for improved speech recognition in environments that traditionally perform poorly, such as stadiums, restaurants, malls, airports, trains, etc.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Suitable Environments

FIG. 1 and the following discussion provide a brief, general description of a suitable computing environment 100 in which a voice-controlled advertisement platform can be implemented. Although not required, aspects and implementations of the invention will be described in the general context of computer-executable instructions, such as routines executed by a general-purpose computer or a mobile device, e.g., a personal computer or smartphone. Those skilled in the relevant art will recognize that portions of the invention may reside on a server computer, while corresponding portions reside on a client computer. Those skilled in the relevant art will appreciate that the invention can be practiced with other computer system configurations, including Internet appliances, set-top boxes, televisions, hand-held devices, wearable computers, kiosks, vehicle computer systems, radios, household appliances (especially ones connected to the Internet), gaming consoles, mobile phones, regular laptops, netbooks, convertible/detachable laptops, tablets, multiprocessor systems, microprocessor-based systems, minicomputers, mainframe computers, or the like. The invention can be embodied in a special purpose computer or data processor that is specifically programmed, configured, or constructed to perform one or more of the computer-executable instructions explained in detail below. Indeed, the terms "computer" and "computing device," as used generally herein, refer to devices that have a processor and non-transitory memory, like any of the above devices, as well as any data processor or any device capable of communicating with a network, including consumer electronic goods such as gaming devices, cameras, or other electronics having a data processor and other components, e.g., network communication circuitry. Data processors include programmable general-purpose or special-purpose microprocessors, programmable controllers, application-specific integrated circuits (ASICs), programmable logic devices (PLDs), or the like, or a combination of such devices.

The invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described below may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Data structures and transmission of data particular to aspects of the invention are also encompassed within the scope of the invention.

Related software may be stored in memory, such as random access memory (RAM), read-only memory (ROM), flash memory, or the like, or a combination of such components. Software may also be stored in one or more storage devices, such as magnetic or optical-based disks, flash memory devices, or any other type of non-volatile storage medium or non-transitory medium for data. Related software may include one or more program modules, which include routines, programs, objects, components, data structures, and so on that perform particular tasks or implement particular abstract data types. As described in more detail below, the particular tasks or abstract data types may concern internals of a voice-controlled advertisement platform or external interfaces, such as software development kits (SDKs), which may be used to apply the voice-controlled platform to a specific context or extend the features of the voice-controlled platform.

A voice-controlled advertisement platform captures voice input from a user typically in the form of an inquiry with respect to specific visual or audio cues and presents a response to the user typically in the form of targeted content. The cues may originate anywhere, including within the voice-controlled advertisement platform, a device on which aspects of the voice-controlled advertisement platform are deployed, or the general environment. Referring to the example of FIG. 1, a voice-controlled advertisement platform operates in or among one or more computing devices, such as mobile devices 105, computer 110, set-top box 112, television 113, or server 115. The computing device may be deployed in vehicles, airplanes, ships and other environments. For example, a vehicle dashboard may include a computing system that listens to the driver and delivers information in response to the driver's questions about anything, from vehicle radio content to information displayed on a billboard at an intersection the vehicle just passed by. The mobile devices 105, computer 110, set-top box 112, and television 113 include a network card or radio or another device that enables them to communicate through one or more networks 140, and include audio input and output devices such as a microphone and speakers. The mobile devices 105, computer 110, appliance 112, and television 113 communicate via the network 140 with a server 115. A data storage area 120 coupled to the server 115 contains data pertaining to the voice-controlled advertisement platform, and software necessary to perform functions of these systems. The voice-controlled advertisement platform may communicate with one or more third party servers 125, which are coupled to data storage areas 130. Third party servers 125 and server 115 may share various data, as described herein.

The mobile devices 105, computer 110, set-top box 112, and television 113 communicate with each other and the server 115 and third party server 125 through the networks 140, including, for example, the Internet. The mobile device 105 communicates wirelessly with a base station or access point 108 using a wireless mobile telephone standard, such as the Global System for Mobile Communications (GSM, or later variants such as 3G or 4G), or another wireless standard, such as IEEE 802.11, and the base station or access point 108 communicates with the server 115 and third party server 125 via the networks 140. The computer 110, appliance 112, and television 113 communicate through the networks 140 using, for example, TCP/IP protocols. The mobile devices 105, computer 110, set-top box 112, and television 113 may also communicate with one another over a short-range wireless standard, such as Bluetooth.

Figure 2:
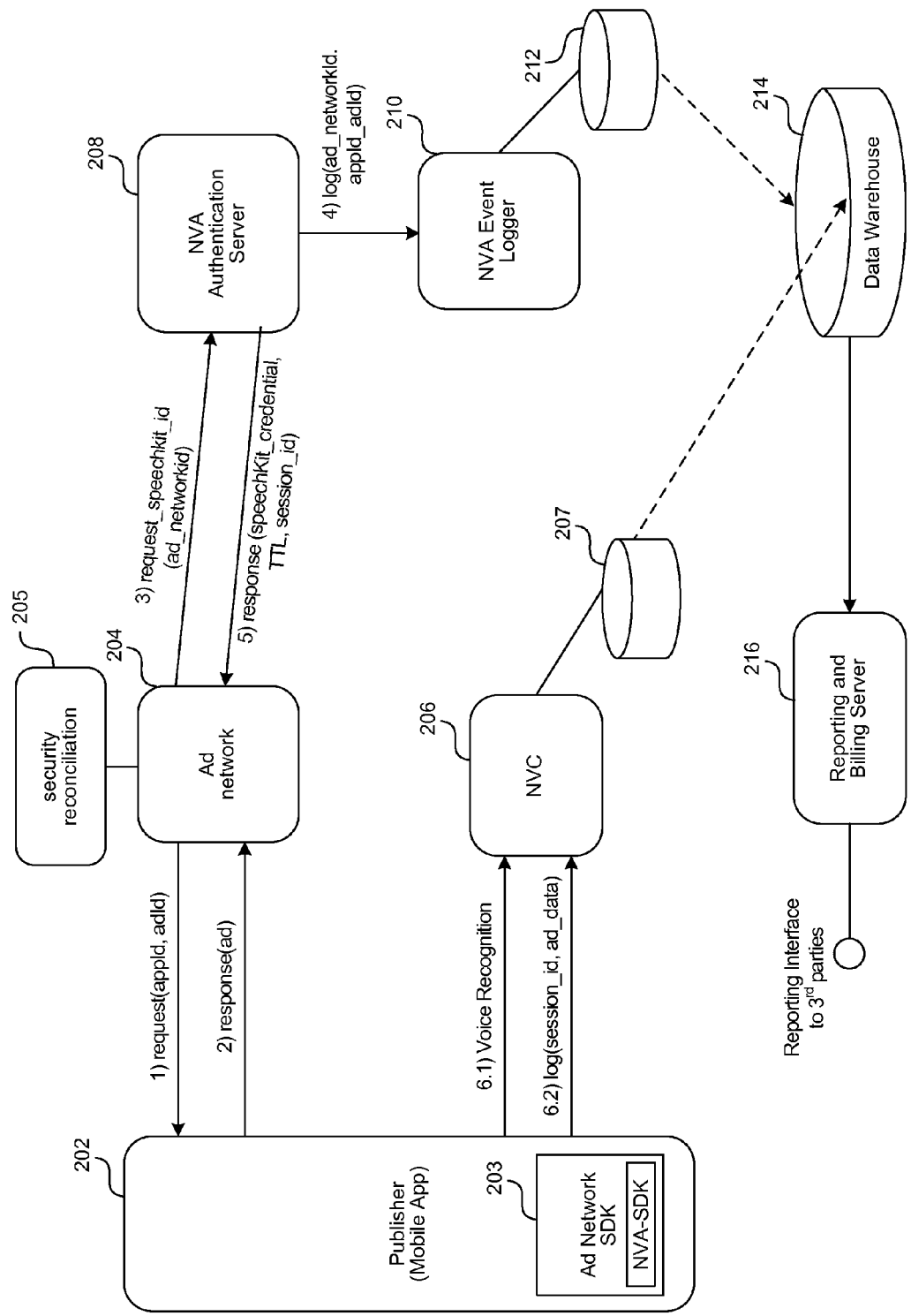
FIG. 2 is a diagram illustrating an example infrastructure for utilizing a software development kit for the voice-controlled advertisement platform.

FIG. 2 is a diagram illustrating an example infrastructure for utilizing an SDK for the voice-controlled advertisement platform to create a voice ad. A publisher platform 202 creates a mobile application that runs on a mobile phone. The publisher platform utilizes an ad network SDK 203 offered by a voice-controlled advertisement platform, bundling advertisement functionalities offered by or provided to an advertisement network 204. The ad network SDK 203 includes a voice ad SDK (e.g. Nuance Voice Ad (NVA) SDK) to create voice ads or other functionality described herein. Speech-recognition capabilities are provided by a voice control environment 206 (e.g. Nuance Voice Control (NVC)), which may be stored on local storage 207, both of which reside on mobile phones, in vehicles, etc. As a result, the publisher 202 (using the SDK 203) enables a mobile phone user to use voice commands not only to access mobile phone features but to trigger targeted content delivery.

The system of FIG. 2 and effectively bundles a voice input and associated SDK with an ad network SDK. The voice input SDK may include SpeechKit from Nuance Communications Inc., which initializes and manages core networking, voice recognition, and audio system components, and works with recognition and voice output functions (e.g. Recognizer and Vocalizer). Recognizer manages the voice recognition process including audio recording and server communication. Vocalizer defines a text-to-speech implementation, and may be initialized with a language or voice and used for sequential speech requests. The ad SDK may be integrated with native mobile applications and mobile operating systems (e.g., iOS, Android) and distributed via app stores to end-users. The ad itself has a series of JavaScript calls that allow it to invoke SpeechKit, where the ad SDK inserts appropriate credentials required for server conductivity and authorization. The credentials themselves may be assigned dynamically to the ad network by an authentication server.

An example of how the system in FIG. 2 operates is as follows. Based on a received trigger, the ad network 204 provides a request message to the publisher platform 202, where the request message includes an application ID and an ad ID. In response, the publisher platform provides a response message with ad content or a pointer/URL/logical address to that content. A security reconciliation component 205 of the ad network authenticates the ad response by communicating with an authentication server 208. The ad network 204 may provide a request ID to the authentication server, where the request includes an ad network ID (the request ID can request a specific SpeechKit). In response, the authentication server 208 logs the request in an event logger 210, where the log entry can include the ad network ID, the application ID and the ad ID. The authentication server provides a response message back to the ad network 204 that includes credentials, such as SpeechKit_credentials, TTL (time-to-live), and session ID data. The Speechkit credentials may consist of a mobile application identifier, and may be a human-readable text string composed from an application developer's name, an application name, and a time stamp, which uniquely identify a particular application. The authentication server 208 has the ability to dynamically assign these credentials at runtime, so that when fraud is detected, the authentication server 208 can disable the fraudulent credentials and reassign new ones, without the application developer having to do anything.

The publisher platform 202 sends a voice recognition request to the voice control environment 206 on the user's device, along with log data, such as a session ID, and ad data, which the voice control environment stores in the local storage 207. Events logged by the event logger to 10 are stored in a database 212. Likewise, events, as well as local grammars, audio files, and other data are stored in the local storage 207. The data stored in both the local storage 207 and the database 212 can be provided to a data warehouse to 14 for storage and reconciliation. A reporting and billing server to 16 accesses data from the data warehouse to provide billing to the publisher, ad network or other parties. Further, the reporting and billing server 216 can generate reports regarding, e.g. Ad effectiveness.

As noted herein, the system may include a scripting tool that has the ability to process metadata such as gender, location, or any other data sent back to the system from the client along with the utterance, or determined from the utterance by the system, to help determine which branch of a previously scripted dialogue to move to. For example, if the user is asked in the system what her favorite food is, in addition to the received response, the system knows that the user is female based on the utterance, and the script may respond with a different response to her than if the user was male. This scripting tool provides added intelligence in the execution of a script, thereby leading to dialogues that can be highly responsive to user preferences. It also provides an easy means by which a lay-developer, rather than a sophisticated developer or a computer programmer, can create a preprogrammed script for providing targeted content to a user based on the various input described herein.

Figure 3:
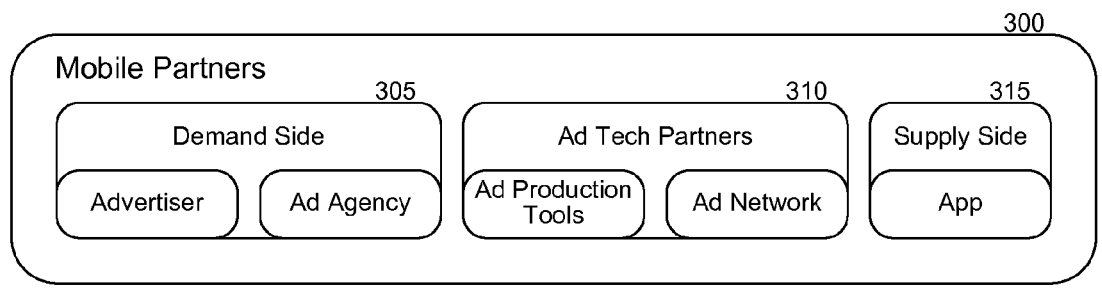
FIG. 3 is a diagram illustrating an example advertising ecosystem.

The voice-controlled advertisement platform, such as that shown in FIG. 2, would support an advertisement ecosystem, as illustrated in FIG. 3. In today's digital world, advertisers and advertising agencies on the demand side 305, such as Toyota and Digitas, would like to advertise various products and services offered by the advertisers through online social media and other digital channels. On the other hand, hosts of these digital channels, and application developers for these digital channels, on the supply side 315, such as Facebook and Angry Birds, would like to utilize advertisements of various products and services as sources of revenue. The role of advertisement technology partners 310, which produce advertisement tools and manage advertisement networks, is to work with the demand side to implement the desired advertisements and deliver the results to the supply side. Examples of such advertisement technology partners 310 include Celtra and Millennial Media. The voice-controlled advertisement platform described herein may be adopted by advertisement technology partners 310 to bring intelligent advertising to targeted consumers.

Voice-Controlled Advertising Platform

Figure 4:
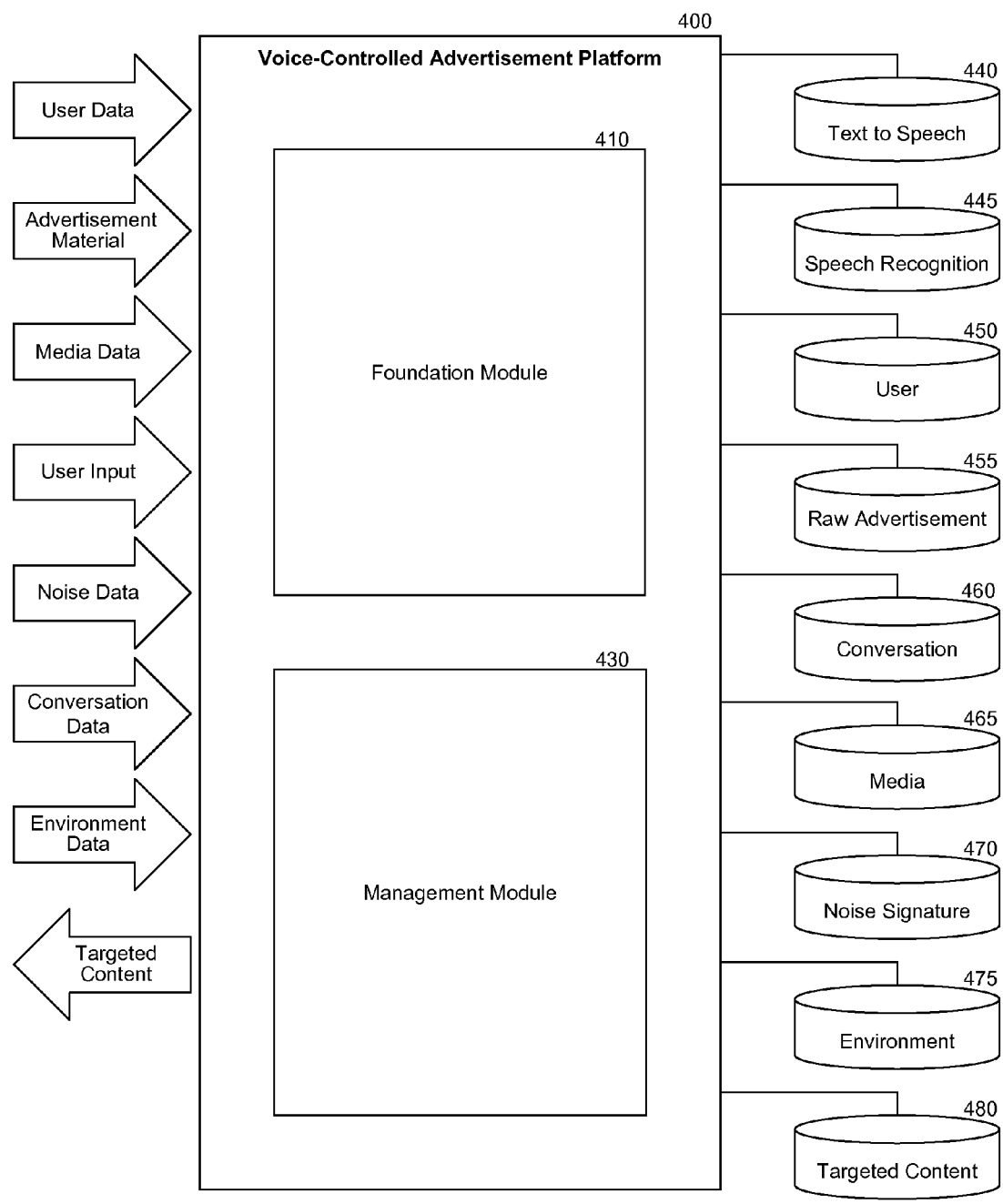
FIG. 4 is a block diagram of example components of a voice-controlled advertising platform.

FIG. 4 is a block diagram illustrating example components of a voice-controlled content delivery or advertising platform 400. The voice-controlled advertising platform 400 accepts different types of input to help determine what a user is communicating through the user's voice and respond to the determined user communication with appropriate content or advertisement. The terms "content" and "advertising" are generally used interchangeably herein, and many examples described the delivery of advertising, but those skilled in the relevant art will readily recognize that any form of content may be used, not just advertising. The input to the voice-controlled advertisement platform 400 includes audio input, including the foreground user input and background noise data, non-audio input, including user data, media data and environment data, and raw advertisement data, including advertisement material and conversation data. The output from the voice-controlled advertisement platform 400 comprises targeted advertising or content.

The voice-controlled advertising platform 400 is configurable for many environments. It can be installed entirely on a server computer, like the server 115, it could be deployed to another device, such as the mobile devices 105, computer 110, set-top box 112, television 113, or it may be distributed among one or more devices and a server or among multiple devices in a peer-to-peer arrangement. The voice-controlled advertising platform 400 includes a foundation module 410 and a management module 430, which while shown as two separate modules, could be combined as a single module on a single device, or divided among two or more modules on two or more separate devices. The advertising platform 400 accesses and/or stores data in a text-to-speech database 440, a speech recognition database 445, a user database 450, an raw advertisement database 455, a conversation database 460, a media database 465, a noise signature database 470, an environment database 475 and a targeted content database 480.

The user input is input data from a user typically in the form of an inquiry with respect to specific media data. In some implementations, user input includes audio data representing words spoken by a user and possibly a corresponding transcript of the spoken words. The voice-controlled advertisement platform 400 may designate special phrases, such as "more information", to represent an explicit user inquiry. However, it may accept any other user utterance and extract a user inquiry with further analysis.

In some implementations, user input is submitted by a user into the device on which the voice-controlled advertisement platform 400 is deployed. In some implementations, a microphone of a device, such as a mobile device or a video game console, can record and transmit to the voice-controlled advertisement platform a recording of words spoken by the user. The voice-controlled advertisement platform 400 can also receive raw or processed user input from another device that captures the user input. For example, deployed in a television, the voice-controlled advertisement platform 400 may receive audio data from a mobile device associated with a user or from a set-top box. It may also process original user input to derive further information.

The noise data includes general ambiance noise. It could correspond to different types of environments, such as a quiet room, a supermarket, and a sports stadium, and different types of noise may be collected and analyzed in different ways. However, the noise data represents the sound in the background that is to be isolated from the sound in the foreground, which is typically the user input. Like the user input, the noise data may be collected in similar ways. It can be transmitted or submitted as standalone data or as an extension of a normal recording of the user input.

The user data represents or describes the user who is interacting with the voice-controlled advertisement platform 400. It is useful for determining what type of advertisement to present to the user and how. The user data can include biometric information, which can be captured, for example, using facial imaging technology, infrared sensors, and the like. It may also include public records, such as marriage licenses, property documents, and law court proceedings. It can further include various types of information characterizing a user's interests. As one example, a user may provide the user's demographic data, such as gender, age, birthday, and birth place. As another example, the user may also indicate the user's profession and hobbies as well as general preferences and particular items of interest in different categories. As additional user data, a user may provide the user's online or other identifies, such as an email ID, a penname, a stage name, and other pseudonyms, as well as the user's speaking and writing samples, which can be further analyzed.

Furthermore, the user data can include information related to a mobile device operated by the user, such as the phone number of a mobile device or an IP address of a desktop computer, or information describing a device used to present media content to the user, such as information describing an operating system of a laptop computer. It may include data transmitted as part of a user's online activities, such as the user's tweets and Facebook posts, and data tracking a user's online activities, such as Internet cookies and logs. Moreover, the user data may include advertisements that a user previously viewed and the user's response to previously-presented advertisements during the user's interaction with the voice-controlled advertisement platform 400.

In some implementations, the voice-controlled advertisement platform 400 collects user data directly from users through surveys or questionnaires. In some implementations, a device in which the voice-controlled advertisement platform 400 is deployed gathers user data using a radio antenna, microphone, camera, and so forth and transmits it to the voice-controlled advertisement platform. In some implementations, the voice-controlled advertisement platform 400 receives the user data from remote sources, such as a server computer. In some implementations, the user data is received from a device associated with a user, communicated via a wireless standard, such as Bluetooth, WiFi, or Near Field Communication (NFC). The voice-controlled advertisement platform 400 may also gather user data during its interaction with the user.

The media data represents or describes the media content presented to a user by a device on which the voice-controlled advertisement platform 400 is deployed. The voice-controlled advertisement platform 400 uses media data for a number of reasons, including for interpreting the user input and for determining how to deliver targeted content or advertisement to the user. Depending on how the voice-controlled advertisement platform 400 is deployed, the media content can be one or more ads, music, radio, a movie, a television show, a television commercial, a radio commercial, a video game (on a console, computer, mobile device, etc.), online video, streaming audio, a banner advertisement, kiosk images, and so on. The media data may also include playback information related to the media, such timing data related to the playback of a movie and other metadata associated with the media. In some implementations, the media data includes a log that describes where or when content elements appear in a media item. In general, the device would transmit the media data to the voice-controlled advertisement platform 400 for analysis automatically or in response to a request by the voice-controlled advertisement platform 400.

The environment data represents or describes items related to a user's location and/or in a user's surrounding that are likely to be of the user's interest. For example, the environment data can include the GPS coordinates of the user, possibly with additional data such as velocity, altitude, etc. Additionally, when the user is at home, an item could be a dog that sits by the user or a song the user was listening to; when the user is in the office, an item could be a book on the user's desk that the user was reading; when the user is on the road, an item could be a store sign or a billboard the user just passed by. As the item depicted by the environment data could be the source or an inspiration of a user's inquiry, the environment data enables the voice-controlled advertisement system 200 to better target advertisement to the user's interest in response to the user input.

The environment data can be captured in various ways. In some embodiments, a user can supply a video steam of the user's surroundings which include images as well as sounds. In some embodiments, a user can supply GPS coordinates of the user's current location via the user's mobile device, and the voice-controlled advertisement system 200 can work with external systems to determine the items that are present at the coordinates (e.g. restaurants near to a sign/billboard).

The advertisement material describes the content in the targeted content presented to the user, either from an external ad source or by the voice-controlled advertisement platform 400 in response to the user's input. In some implementations, it includes a group of voices that is to be used to synthesize speech for conversational advertisements. In general, the advertisement material includes text, images, audio, video, and a combination of those, and so on regarding various items that could be interest to a user. It may include a static presentation or it may contain information that prompts a user to take further actions. The advertisement material is normally supplied by advertisers.

The targeted content is responsive to the user input, such as question or a request. The targeted content may include text, audio, video, pictures, statistics, a link to a file stored in a server computer, and the like. In some implementations, the targeted content includes basic user prompts and responses. In addition to information that specifically addresses the user's inquiry, the targeted content may contain additional information about the subject matter of the user's inquiry or information about related subject matter, which may trigger further inquiries from the user.

Figure 5:
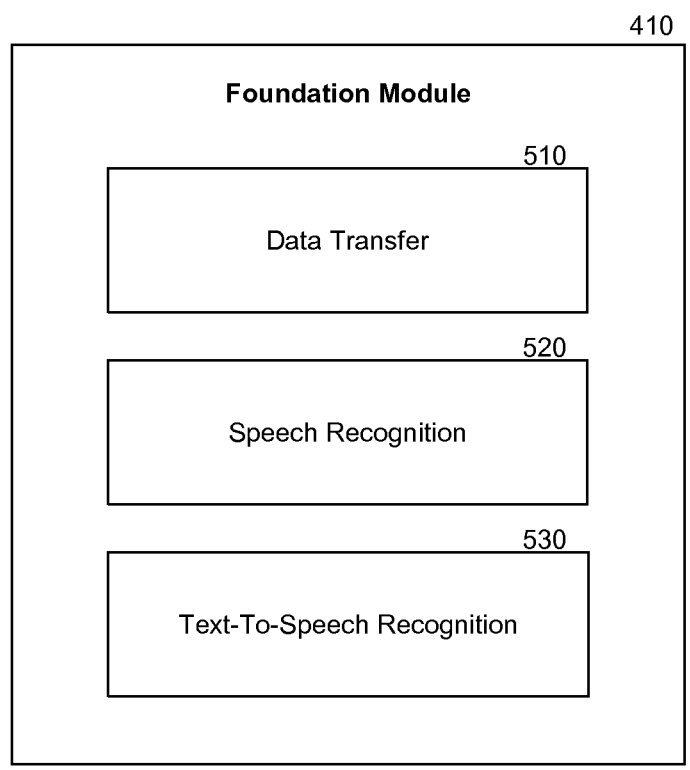
FIG. 5 is a block diagram illustrating example components of a foundation module.

The targeted content may be delivered to the user through a device on which the voice-controlled advertisement platform 400 is deployed, through another device being used to consume media content, or via other means. As one example, when it is deployed on a television, the voice-controlled advertisement platform 400 can send the targeted content to the user via email or text, or to the television in a displayed informational window. As one example, even when it is not deployed on a user's desktop computer, the voice-controlled advertisement platform 400 may deliver the targeted content to a user through a web browser installed on the user's desktop computer, which the user can access at the user's convenience. FIG. 5 is a block diagram illustrating example components of the foundation module 410. The foundation module 410 comprises a data transfer module 510, a speech recognition module 520 and a text-to-speech recognition module 530.

The data transfer module 510 receives all types of input data. It sends the input data to appropriate modules for immediate processing, the results of which would be saved into appropriate data storage or databases, or stores the input data into appropriate databases for future processing. For example, the data transfer module 510 would send the noise data and the user input to appropriate modules for immediate processing and saves the results into the noise signatures database 475 and the speech recognition database 445, respectively. As an alternative, it may store these data into appropriate databases first. It would also save the user data, the media data, the environment data, the conversation data, and the advertisement data respectively into the user database 450, the media database 465, the environment database 485, the conversation database 460, and the advertisement database 455.

The speech recognition module 520 receives audio data and generates a transcription of spoken words represented by the audio data. The audio data includes the user input that is received by the voice-controlled advertisement platform 400 which represents words spoken by the user. The speech recognition module 520 utilizes a speech recognition application, such as Dragon, which is also sold by Nuance Communications, Inc. The speech recognition module 520 stores the transcription data in the speech recognition database 445.

In addition, the speech recognition module 520 may build or receive specialized grammars. It manages a lexicon of textual objects and builds or accesses language models to map speech data to the textual objects. The lexicon could be for a specific event or scenario. For example, for a music concert by a pop artist, the lexicon may include the name of the artist, the location and play list of the concert, and some other jargons used by a young population. The focus of the lexicon normally reduces the size of the specialized grammars, making them especially suitable for offline use in the corresponding event or scenario. The system may dynamically grow the language models as it processes more speech data. For example, as the number of user inquiries containing a specific name increases, it may build a language model that includes a comprehensive and accurate sound characterization of the name and of certain attributes usually associated with the name. More generally, the user inquiries can be compiled in a crowdsourcing context. For example, when an ad campaign is running, a large number of people could engage in the one or more ads included in the campaign. The results are user interactions associated with various ad categories and user groups, which enable the system to identify the most relevant dialogues for each of the ad categories and user groups and build specialized grammars accordingly. In addition, the speech recognition module 520 may maintain a master set of language models based on speech data received across multiple client devices on a server computer or in a cloud environment, and synchronize the language models used on individual devices with the master set. Finally, even being built from crowd sourcing for a specific event or scenario, a language model may not account for all possible user interactions. In the actual deployment, a user may still deviate from an anticipated set of inputs. Therefore, the system may also include a default set of responses in the language model to conclude a dialogue in an acceptable manner. For example, the system may include a default ad to provide if the system is unavailable or otherwise cannot accurately serve up a targeted ad to the user.

Furthermore, when the voice-controlled advertisement platform is deployed on both a user device and a server computer, the speech recognition module 520 may preload or receive via the network some of the specialized grammars or language models, which include the default set of responses, to client devices to reduce response time to a user. In some implementations, the speech recognition module 520 may assign a weight to each language model depending on how often it has been used, how much it has expanded, how complex it is, and other factors. It may assign a larger weight to a language model that is more useful, more refined, or more time-consuming, for example, and it may assign a single weight to each language model or multiple weights respectively corresponding to pre-defined user groups.

Next, the speech recognition module 520 may preload those language models having larger weights to all the client devices or to the client devices of members of individual user groups. The preloading may be performed periodically or at specific times. It may be performed when the network load between the server computer and the client device is relatively low, when the weights of the language models have changed sufficiently, when sufficiently many new language models have been built, and so on. The preloaded language models may then be stored in a local storage or in a cache on the client device to further expedite the utilization of these language models. As a result, a user inquiry may be analyzed immediately if one of the preloaded language models is applicable.

The text-to-speech module 530 receives text and converts it into speech. The text-to-speech module 530 may receive predetermined conversation data to convert to speech. For example, the text may be a response of the voice-controlled advertisement platform to a user. The text-to-speech module may also receive input pertaining to speech preferences. The text-to-speech module 530 utilizes a speech synthesizer. One suitable speech synthesizer is sold by Nuance Communications, Inc. and called Vocalizer. The text-to-speech module 530 stores the speech data in the text-to-speech data database 540. In general, no new components would be required on the client device, since much of the technology resides on the server, and is accessible to the client via the network, although as noted herein, the client may include some locally stored data or components, such as specific grammars for use in an off-line context.

Figure 6:
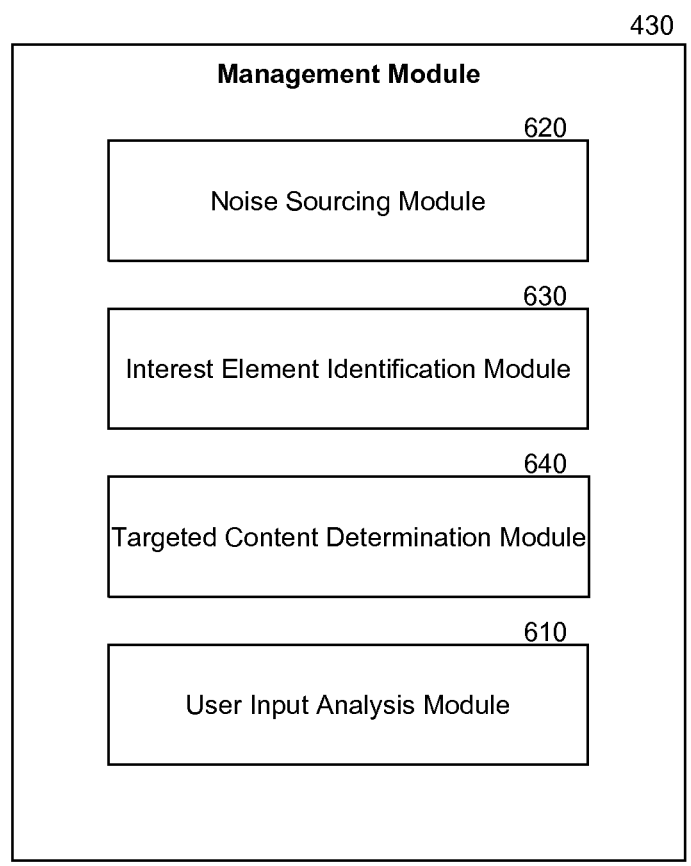
FIG. 6 is a block diagram illustrating the example components of a management module.

FIG. 6 is a block diagram illustrating the example components of the management module 430. The management module 430 comprises a noise sourcing module 620, a user input analysis module 610, an interest element identification module 630, and a targeted content determination module 640. These components can be used to improve audio recognition, and improve user advertisement interaction experiences.

As discussed above, the voice-controlled advertising platform 400 is configurable for many environments, and thus the components discussed so far may be deployed on a server computer or one or more devices. One application typically deployed on the client side may account for interruptions as speech or advertisements are being played back to the user. Specifically, the voice-controlled advertising platform 400 may employ existing technology (e.g. Nuance's "Barge-In" technology) to control the playback—pause, stop, fast forward, fast backward, change volume, etc.—in response to the sound levels in the playback environment. It may further utilize voice signatures or other speech characteristics to distinguish the foreground sound from the background noise. As a result, when a user is in a crowded environment, when a group of people start talking in the background, the voice-controlled advertising platform 400 may amplify the playing of an advertisement, while when the user starts speaking, the voice-controlled advertising platform 400 may interrupt the playing of the advertisement, to ensure the best user experience of enjoying the advertisement.

Noise Characterization and Improving Audio Recognition/Delivery

Considering first how the management module 430 improves audio recognition/delivery and noise characterization, the noise sourcing module 620 receives noise data from or corresponding to different types of environments. The noise sourcing module then generates a noise signature for each environment or type of environment, and stores the noise signatures in the noise signature database 475 for subsequent use, including sharpening foreground audio (e.g. "voice") corresponding to the same environment. The noise sourcing module may receive multiple noise samples from multiple users in various environments, normalize or average the samples, and generate a noise signature with respect to various sound attributes, such as loudness, intensity, pitch and frequency. It typically accepts noise data received from a large number of sources at a particular location and time, and iteratively refines the noise signatures based on the enriched noise data. In some implementations, the noise data is obtained from leaving a microphone exposed after recording an input from a user or before playing a response to the input to the user. Alternatively or additionally, the noise data comes from voluntary submissions from users. For example, functionality stored on mobile phones may allow users to opt-in to periodically or sporadically provide to the system background noise received from one or more microphones on the mobile device, which the system uses to improve, for example, voice recognition, as described below.

Additional features of a mobile device and of existing APIs may be relied on to automatically gather data. For example, granular location data obtained through location detection features, such as Qualcomm's Gimbal platform or Apple's iBeacon solution, may be leveraged to triangulate background noise on one side of a building as opposed to another. For example, multiple mobile devices in a location may each gather background noise, and through the use of iBeacon (using Bluetooth signaling), identify the location of a noise and locations of users within that location.

Further, using a combination of sensors on a phone, such as a light meter, a gyroscope, and an accelerometer, the system can make an inference as to whether the phone is "out" (on the table, in the hand) or "in" (in a pocket or inside of a purse). For example, if the light sensor does not detect light, the accelerometer detects continuous movement, the GPS sensor does not detect geographic movement, and the microphone senses loud background music, the system may determine that the user could be dancing. Knowing this level of phone positioning or context and further correlating the background noise among all the phones in a given area that are in the same position (in pocket, in purse, outside) will help strongly identify the specific signature of the background noise at that moment in time to help remove it entirely from the signature of the user who is speaking into the system. Typically, the noise data gathered as described above can easily be retrieved from the phone, and then transmitted to the server.

From this data, the noise sourcing module 620 can predetermine or define different types of environments, such as a quiet room, a supermarket, an airport, restaurant, and a sports stadium, and it may allow users to define additional environments. It may determine the environment associated with each piece of noise data using information explicitly provided by the user or work with external systems to determine the location of recording. For example, each received noise signal can include a timestamp and location coordinates (e.g. GPS latitude and longitude), which the system can then use to identify a business located at those coordinates (e.g. an airport, a stadium, a restaurant, etc.).

In general, a noise signature for an environment, which represents the average noise level, may be used to estimate the current noise level when the current noise level for the environment is not available. In some implementations, when the voice-controlled advertisement platform 400 is to extract a user's voice from a recording performed in an environment, the noise sourcing module 620 may use the noise signature for the environment to isolate noise from the recording for the speech recognition module 320 to properly recover the user input using available noise subtraction techniques. Alternatively or additionally, before the voice-controlled advertisement platform 400 sends a response to a user in an environment, the noise sourcing module 620 may use the noise signature for the environment to estimate the current sound level for the environment or to gauge how the current sound level that is available compares with the average noise level for the environment. The noise sourcing module 620 may then communicate the result to the voice-controlled advertisement platform 400 to select an appropriate voice for delivering the content or response, or even whether to send the response or send it in a different fashion (e.g. via e-mail). It may also halt further action until the current sound level is significantly lower than a predetermined noise threshold or noise level indicated by the noise signature.

Figure 7:
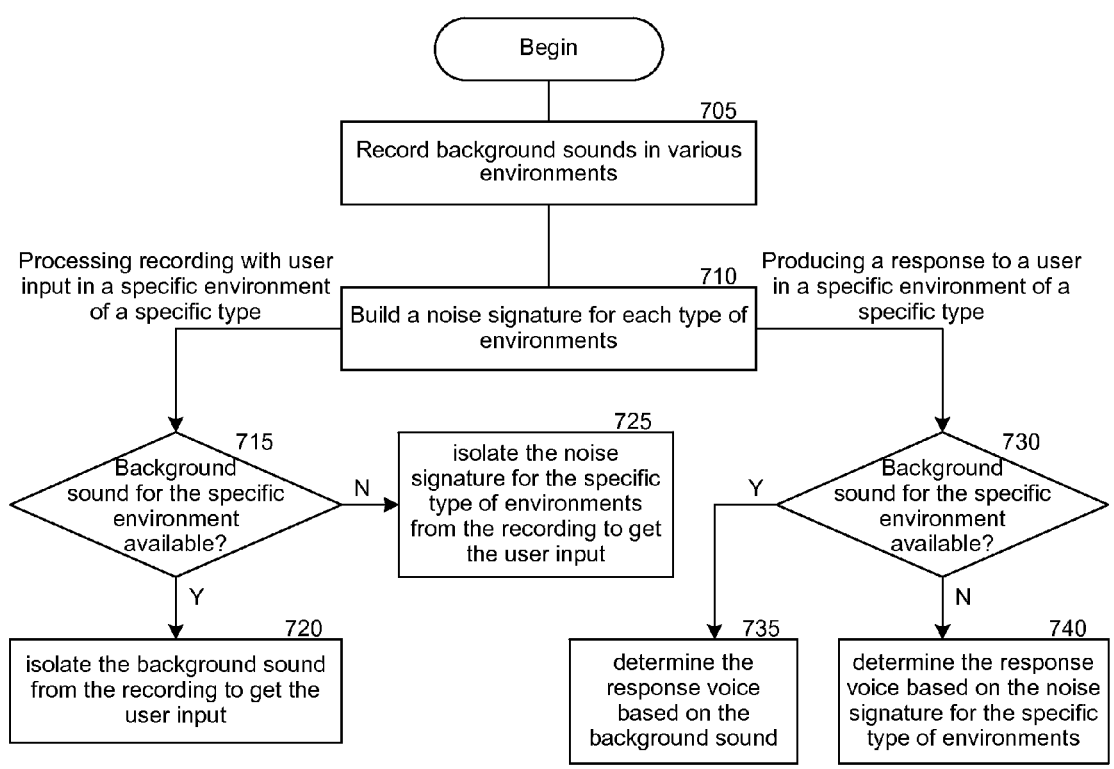
FIG. 7 is a flowchart illustrating an example process of creating and utilizing noise signatures.

FIG. 7 is a flowchart illustrating an example process performed by the noise sourcing module 620 for creating and utilizing noise signatures. At block 705, the noise sourcing module 620 receives and stores audio data with background sounds as noise data for various environments. For example, it may capture, from each of multiple users, the background sound after a user provides a voice input or before providing a response to a user's voice input. The received audio data may include not only a timestamp indicating when the audio data was obtained at each user's environment, but also location coordinates associated with that environment.

At block 710, the noise sourcing module builds a noise signature for each location or type of environment, such as a quiet room, a supermarket, and a sports stadium. For example, the system gathers multiple noise data samples and combines or normalizes them when certain thresholds are met to create a noise signature file. For example, the system may employ a time threshold and a location threshold and only combine data samples within the time and location thresholds (e.g. within the last hour, and within a predetermined radius distance or number of decimal degrees/latitude-longitude seconds). Once processed, the system can store the processed audio as a noise signature file for that location or for similar locations that correspond to one type of environment having a substantially similar noise signature, and provide an environmental tag associated with that location. For example, the system can perform a query of a location index using the location coordinates to determine the type of business existing at that location, and then tag that noise signature file with metadata indicative of that type of business.

In processing a newly received audio portion or recording containing user input in an environment of a specific type, at block 715, the noise sourcing module 620 determines whether any noise signature file for the specific environment exists. If the noise signature file exists, at block 720, it subtracts noise data from the recording to recover user input. In other words, if the newly received audio is from or associated with a location for which the system already has stored a noise signature file, then the system assumes that the noise at that location is substantially similar to that associated with a noise signature file, and thus the system can subtracts that noise data from the received audio to obtain the user input. The system may also check in block 715 whether the noise signature file has a timestamp that is sufficiently recent. For example, the system may only perform the functions under block 720 if the noise signature file for that location is less than eight hours old. (If the noise signature file is beyond the time threshold, then the system will again attempt to create a new noise signature file as noted above.)

Otherwise, at block 725, the system uses a noise signature previously built for the specific type of environments to estimate the noise data for the specific environment. For example, the system determines the location associated with the newly received audio portion and determines a type of business or other environment associated with that location. The system then retrieves a noise signature tagged with that type of location, and then processes the received audio based on that type of environment.

The noise sourcing module 620 also determines a type of ad or response to provide to a user. In producing a response to a user in a specific environment of a specific type, at block 730, the noise sourcing module 620 similarly determines whether any noise signature file for the specific environment is available. If the noise signature file is available, at block 735, the system uses the noise data from that file to determine whether to include a voice component in the response and the attributes of the voice component. For example, when the noise level is expected to be high in that environment, then the response voice provided is louder. Alternatively, if the noise level is expected to be low, the response provided is likewise lower. If the noise signature file is not available, at block 740, it uses a noise signature previously built for the specific type of environments to estimate the noise data for the specific environment, Further, if the noise is simply too high, then the system may employ alternate channels for delivering the content, such as by e-mail, text, etc.

An example of a generic data structure that can be used for the noise signature file can be as follows:

| File ID | Time | Location | Environment Type | Noise Signature |
|---|---|---|---|---|
| 12345678 | 2:23:13 | 47.606201; −122.3321 | Shopping mall | Noise_File_A |
| 23456789 | 5:24:56 | 47°12'31.885" 122°50'28.798" | Café | Noise_File_B |

As noted, the noise sourcing module 620 receives noise data corresponding to different types of environments, generates a noise signature for each location or each type of environments, and stores the noise signatures in the noise signature database 475 for subsequent use. The system can perform some post-processing to noise signature files to help tune or optimize the system. For example, the system can compare noise signature files from the same location over a time interval (days, weeks, etc.). If the system determines that the noise signature file is substantially equivalent within that interval, then the system can automatically apply the stored noise signature file for that location or that environment, and no longer need to request noise data to be periodically provided by user devices at that location.

In gathering background noise, the system can also employ techniques to improve its performance, such as providing prompts for the user regarding the environment. For example the system can compare a current noise signature to stored noise signatures, and if the current noise signature is substantially different from all storage signatures, then the system can prompt the user with one or more queries to inquire about the nature of the noise at the user's location. In one embodiment, the system initiates an instant messaging or SMS/IMS session with the user's mobile device to obtain further information regarding the user's location and noise there.

Characterizing noise may be helpful for recognizing or eliminating noise in other, non-advertisement-related contexts. In general, noise signatures could be useful whenever input audio data is not created in an ideal recording environment. Thus, the system may be integrated with many different environments, and preferably installed below an application layer so as to intercept APIs for certain audio functions and provide improved performance. Thus, the system may be logic inserted right after audio data is received from a microphone.

As one example, any automated telephone customer service (interactive voice response (IVR) system), which expects user speech made in any location, may benefit from the use of noise signatures. Thus, the system can work with or intercept APIs from the IVR to process audio receive from the user before that audio is provided to the IVR system. As another example, an application like Shazam, which expects music or other audio entertainment playing in any location, may also benefit from the use of noise signatures. Specifically, Shazam may receive audio input that contains a replay of a recorded song as well as background noise. By allowing the system to intercept the audio data and apply an appropriate noise signature to eliminate or attenuate the background noise, the Shazam application can receive the song audio with minimal added noise, and increase the accuracy of identifying the recorded song.

The system can also be used to perform automated content recognition that extends beyond simply recognizing a user's utterance. As one example, the system may be used to monitor background audio to detect, e.g., an advertisement and perform an analysis of that advertisement, such as comparing it against a database to identify the particular advertisement that a user is currently listening to, in a manner similar to how Shazam analyzes audio, compares it to a database and determines which song is being played. As another example, the system may be combined with existing technology, such as those which manage television programming information and those which perform content discovery on television shows (e.g., processing words spoken in television shows or corresponding closed-captioning text), to periodically determine the category, genera, or even plot of a television show a user is watching. Based on information from various sources indicating the user's preferences, such as being combined with the user's internet search history data, the system may be able to notify the user when certain topics of the user's interest are being discussed on one of the television shows often viewed by the user, so that the user can watch it or record it. As discussed above, such automated content recognition can help further distinguish between the background sound and the foreground sound on the one hand and narrow down the user's areas of interest on the other hand, thus improving targeted content delivery.

For example the system may use Nuance's Dragon Mobile Assistant to identify, via automatic content recognition, that the user is watching the television station CNN. It may further correlate from his search history on the mobile assistant that he is interested in technology stocks. Combining this information with personal profile data, a personal assistant on the user's mobile device might notify the user that there is a breaking-news story on technology stocks on CNN, even if the user is not watching CNN at that time. Under this example, the system may integrate closed captioning data for the CNN channel or integrate with a third party vendor such as boxfish.com.

In addition, the system may compare and contrast the noise signatures for different environments and determine appropriate prompts to the user accordingly. For example, the system could listen for noise signatures for freeway driving vs. city driving, and make assumptions about the driver's ability to focus/participate (more distracted in city driving, more relaxed in freeway driving, etc.). As a result, the system could engage a more soothing dialogue when it recognizes that the driver is in stop-and-go type driving (city or in traffic on a freeway), be more verbose or entertaining when it recognizes that the car is on the freeway, and so on.

The system may also develop noise signatures not only for certain environments, but also for certain situations, so as to provide additional feedback to users or to implement other functionality. Noise signatures can be useful in recognizing certain noises themselves, especially when the noise level is higher than normal, which could signify an issue or abnormality in the environment. For example, it may be especially loud when one or more windows of a car, including a sunroof, are not fully closed. In this case, the noise level in the car may be significantly greater than that represented by the noise signature for a sealed car and more comparable to that represented by the noise signature for a car with open windows or a moving motorcycle, for example. As a result, the system may recognize the noise as corresponding to a noise signature file for a moving car with one or more open windows, and alert a user in the car of the issue and prompt him to take remedial actions to resolve the issue. For example, the system may provide a speech output to the vehicle's sound system, or send a text to the user's mobile device, asking the user to close windows in the car, particularly to improve voice recognition if the system has just received an utterance from the user for the system to analyze. Thus, the system compares received audio data to noise signature data to understand certain environments and associate with those environments user prompts or queries that the system can automatically provide to the user when those particular noise signatures are detected. Furthermore, the noise signatures may be useful in processing received audio to subtract out noise and determine context or environmental data associated with the user. For example once noise is subtracted from received audio, the system can determine that two distinct types of audio data remain, namely an utterance from the user, and a background song. Based on these two types of remaining audio data, the system may be able to determine with more certainty whether the utterance relates to the song. Thus, the system can more accurately determine the user's inquiry and intent or desired result.

Thus, the voice-controlled advertising platform can identify unique noise signatures or audio footprints for received audio to identify not only certain environments to be identified, but also additional content. That additional content can be the spoken input from a user, where that spoken input can be used for user authentication. Thus, the system can receive user input, determine a voice signature from that user input, and compare it to a database of other user signatures to automatically authenticate a user. Thus, the system can use a voice biometric to automatically identify a user and to authorize or authenticate an operation. For example, by using such a voice biometric, the user can more easily, yet securely, authenticate a credit card purchase or other merchant or financial transaction.

Another application in noise recognition is advertisement fraud detection. Fraud associated with ad serving may be caused by bot algorithms which generate fake clicks or devious publishers who "stack ads" so that only one ad is visible to a user and yet one click counts for multiple ads. Especially in the case of bot algorithms, the fake clicks are performed through software manipulation, thus resulting in no clicking sound at all, often in the absence of humans. As a result, the fake clicks can be associated with ambient noise instead of a combination of mouse clicking and other human activity. Accordingly, by using ambient noise detection combined with background noise signatures, the system can validate genuine engagement with the user in ad serving.

Moreover, by delivering voice ads to a user's device as described herein, and then monitoring for delivery of those ads via that device, or other nearby devices, a "feedback loop" is provided so that the system can listen for the delivered ad and confirm that it has been delivered. For example, the system may determine that a beer ad should be delivered to a particular device or user. The system can then monitor or "listen for" delivery of that ad within that geographic region, such as monitoring background audio from nearby devices to confirm that the intended beer ad has been played within that geographic region (even if it is uncertain of the specific device that played the ad).

Improving User Advertisement Interaction Experience and Content Delivery

In addition to improving audio recognition and delivery, the management module 430 can also improve user advertisement interaction experiences and content delivery, which includes selecting particular advertisements based on the user and information regarding her surroundings or other context. Further, the management module can implement advertising scripting tools, and cash speech recognition grammars and common responses, as described below.

The user input analysis module 610 examines the input from a user to help determine which targeted content to present to the user. In some implementations, the user input analysis modules predefines a set of phrases, such as "More information" and "Tell me more about [to be filled in by a user]" and processes only those phrases as the user input. For that purpose, it may build custom grammars and parse the user input accordingly. In some implementations, the user input analysis module 610 receives the user input from the speech recognition module 420 and attempts to identify an inquiry from the user input. The user input may or may not be specific enough to identify the subject matter of the user's inquiry. For example, when watching a comic show featuring a standup routine, a user may be wondering who the comedian is. As a result, the user may utter "Who is that?", which is very generic, or "Who is that comedian?", which specifically refers to the subject matter. In this case, developers employing the system can dynamically create or access custom grammars to support a range of comedians, actors, or other entities that may be on screen, based on a live feed of programming information from the TV network, (or closed captioning for that live feed) for example. The user input analysis module 610 therefore analyzes the speech recognized by the speech recognition module 420 according to the customer grammars to extract any useful information, using various natural language processing techniques. When it deduces the subject matter of the user inquiry, the user input analysis module 610 would pass it on to the interest element identification module 630.

The user input often would not reveal enough information to precisely determine the subject matter of a user's inquiry, or the interest element. When that is the case, the interest element identification module 630 analyzes different types of data in an attempt to determine what the interest element is. One source of interest elements is the media data transmitted through the device on which the voice-controlled advertisement platform 400 is deployed. Another source is the environment data characterizing a user's surroundings, which often comprises media contents, such as streamed videos of a user's environment. The initial environment data may also lead to further environment data which comprises media contents. As one example, depending on approximately when and where the user input is received or accepted, the interest element identification module 630 may access information on what was playing on a user's radio or television at that time. It may recognize some audios or videos being displayed on the user's radio or television using voice biometric or image matching technologies and compare the recognized audios or videos with known programming lineups. As another example, the interest element identification module 630 may use GPS coordinates received from the user device to retrieve maps and images of the corresponding location with a list of points of interest. Yet another source of interest elements is the advertisements which were previously presented to a user and to which the user then responded. These advertisements would also contain media contents. Any source data may be limited to those to which a user is exposed during the last thirty seconds or a specific timeframe that is commensurate with an average person's response time.

Given potential sources of interest elements, the interest element identification module 630 needs to narrow down potential interest elements. There may be various items in specific media contents that can be candidate interest elements. Such items include a visual object, a sound, a spoken word, a graphic, or the like, that is displayed, played, referenced, or otherwise presented to a user as part of media content. For example, it could be the image of a car or the utterance of "the car". In general, the interest element identification module 630 analyzes the specific media contents to recognize items that are likely to be interest elements using various techniques, such as object-based image analysis (OBIA) and music structure analysis. In some implementations, media metadata, including a list of potential interest elements, is predefined and received by or delivered to the voice-controlled advertisement platform 400 from external sources. A media provider may supply certain media contents together with metadata, which constitutes annotations or translations of the specific media contents for further analysis, or explicitly enumerates potential interest elements and their times of appearance in the specific media contents. For example, the platform 400 may access a database of billboard locations and content displayed on those billboards from a billboard company like OutdoorBillboard.com, and analyze a user's query based on content on a billboard at a location near to where the user made the query. As another example, the platform 400 may access a database of radio content broadcast by one or more stations at a particular time and location, and compare that to audio content received from the user (e.g. accessing a radio content database from Clear Channel). Thus, users may have a conversational experience with an ad they hear on the radio. In some implementations, the interest element identification module 630 analyzes the specific media contents to deduce information possibly related to interest elements, using natural language processing, image matching, text analysis or other techniques.

When the specific media contents are complex with many recognizable items, however, the interest element identification module 630 may analyze the user data, which often reveals the identity and interests of a user, to help narrow down the list of candidates, using various data mining and correlation techniques. As one example, the user data may indicate that a user listens to a lot of rock music, does not read many books, has no interest in cooking, and has an extensive collection of watches. The interest element identification module 630 may then use the user data to favor items related to rock music and watches and disfavor those related to books and cooking. As another example, the user data may indicate that a user has repeatedly inquired about arts and crafts during the user's online activities or the user's interactions with the voice-controlled advertisement platform. Therefore, the interest element identification module 630 may give more weight to a recognizable item that is related to arts and crafts.

Even after recognizing a potential interest element, the interest element identification module 630 may need to conduct further analysis to identify the interest element with greater probability. For example, given the image of a car, the interest element identification module 630 would look it up in a car database to get the make and model of the car. Such study can be conducted through the internet, external knowledge bases, external knowledge-discovery specialists, and so on.

Once the interest element identification module 630 determines an item of interest, the targeted content determination module 640 determines which targeted content (including targeted ads) to provide to a user in response to the user's input and how to deliver the targeted content to the user. When the user requests additional data, e.g. responds to an ad, the user's response may become additional user input, and the targeted content determination module 640 responds to the additional user input.

The targeted content determination module 640 chooses the targeted content from the advertisement database 455. In general, it identifies an advertisement or additional content that responds to a user's inquiry and thus is related to the interest element. For example, if the user's inquiry is "How much is that car?" with respect to a car of a specific make and model featured in a scene of a movie the user is watching, the targeted content would include pricing and related information of that specific car. In some implementations, the targeted content corresponding to an item in specific media contents may be predetermined. For example, a media provider may supply certain media contents with related advertisements and metadata specifying potential interest elements in the media contents and the corresponding advertisements.

Figure 8:
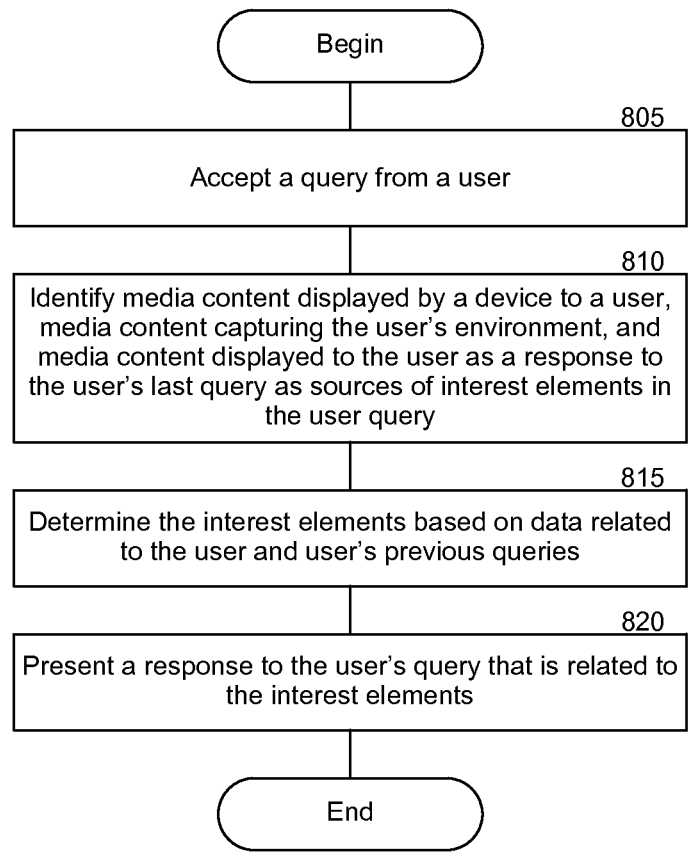
FIG. 8 is a flowchart illustrating an example process of responding to a user's voice input with targeted content.

FIG. 8 is a flowchart illustrating an example process of responding to a user's voice input with targeted content. At block 805, the user input analysis module 410 receives audio input from a user and analyzes user speech in the audio input to recognize an inquiry. In one example, the user may be driving in a car, passing a billboard, and requests more information regarding a product displayed on the billboard by saying "tell me more about that billboard". The user's smart phone, a dashboard computer in the car, or a combination of the two, receive the audio input from the user requesting more information. The phone/car adds metadata to the audio input and sends both the audio input and the metadata to the server wirelessly, where the metadata includes user identification information (e.g. mobile/car ID number), time of day, location of the car/phone, etc. Upon receiving this, the system recognizes the inquiry from the user based on the utterance and invokes the modules under the management module 430.

At block 810, the interest element identification module 630 identifies sources of the interest elements, namely the subject matter of the user's inquiry, from media data provided by a device on which the voice-controlled advertisement platform 400 is deployed, environment data regarding the user's environment, and/or the targeted content previously provided or displayed by the voice-controlled advertisement platform 400 as the response to the user's last inquiry. In this manner, the system is being receptive to a user's inquiring about a wide range of items to which the user is exposed. Continuing with the above example, the system accesses a third-party database to determine the content of the ad displayed on the billboard based on the user's location and time.

At block 815, the interest element identification module 630 determines one or more interest elements from the one or more sources identified in block 810. Under block 815, the system may also use user data showing the identity and interests of the user and the user's previous inquiries unrelated to recent, previous inquiries, such as for deriving more detail regarding a user's interests. Again, continuing with above example, the system analyzes the users inquiry, which specifically mentions a billboard, and thus the interest element identification module 630 determines with high probability that the user is interested in additional content regarding a product displayed on the billboard that the user recently passed in his car. An identity of that particular product can be obtained from the third party billboard site.

At step 820, the targeted content determination module 640 presents or provides targeted content that is related to the interest elements in response to the user's inquiry. In this example, the system may send an e-mail or text message to the user's mobile phone with a URL to a particular webpage by a manufacturer of the product, where that webpage provides more details regarding the product. The e-mail or text message may include additional information to the user, such as the time of day and location as to when the user may the request, etc.

In some implementations, the targeted content determination module 640 determines the format and contents of the targeted content based on all possible data. For example, the targeted content determination module 640 may determine a voice with an appropriate volume, pitch or any other attribute or no voice at all for the targeted content based on the analysis result produced by the noise sourcing module 620. In some implementations, the targeted content determination module 640 analyzes a user's input and other writing or speaking samples to specifically deduce the user's interaction styles, such as being reserved or authoritative, and the user data overall to determine the user's identity, such as being a female or a teacher, the user's mood, such as being bored or motivated, and the user's temperaments, such as being impulsive or indecisive.

In some implementations, the targeted content determination module 640 examines other user-related data that may reveal user preferences. As one example, the user's music selections and television viewing patterns may indicate a preferred tone and speech style with which the user is comfortable. By analyzing the audio surrounding a user to identify names of specific songs and television shows perceived by the user, the system can retrieve actual sound bites of the songs and the shows as well as related metadata from original producers or other curators and analyze the retrieved data along the desired dimensions.

As another example, the system can, using known APIs, access the user's email, voicemail, and/or calendar and analyze the data from the email/voicemail/calendar to determine the user's current mood and mental state. For instance, when e-mail/voicemail messages that the user sends tend to be verbose, or when the user's schedule is wide open, the user may not be rushed and may welcome a descriptive style. When the user's voicemail messages include heavy breathing or high pitches, or when a meeting reminder has not been acknowledged indicating that the user is late for the meeting, the system may determine that the user is in a rush and opt for an instant or delayed delivery depending on the length of the content to be delivered.

An example of a suitable data structure for providing targeted content for particular users may be as follows:

| User ID | Language | Style | Mood/Voice | Delivery | Rules |
| --- | --- | --- | --- | --- | --- |
| 987654 | English | Formal | Succinct | Office PC | Time-based |
| 876543 | French | Informal | Irreverent | Mobile | Geographic |

In this example, users may have a separate profile that indicates their preferred language, style of delivery, mood for that delivery, delivery location, and rules for that location. In the first example, the user prefers content in English, and presented in a formal style, but in a "rushed" or abbreviated format which is provided to a preferred location (the user's office computer), where the delivery rules are based on time (e.g. office hours). Other styles and moods can represent the type of response, such as human versus robotic, generic versus one associated with or from a voice actor (e.g. William Shatner), funky versus authoritative, upbeat versus stern, and so forth. The delivery can also be associated targeted to particular vehicles or locations, such as delivery to an automotive environment, a train, a boat/ship, an airplane, etc. Each of these vehicles can have an associated widget or application to provide the functionality described herein.

As noted above, the targeted content determination module 640 determines a voice that suits a user's identity, mood and temperament and matches the user's interaction style, which may be based on user profiles, and which can be useful in any automated communication. But, as described herein, the system may automatically determine a mood or temperament to apply based on analysis of a user's received utterance.

As one example regarding the use of particular voices for content provided to users, an eVite or an electronic greeting card may incorporate a customized voice in a recording based on the occasion, the intended audience, etc. A child going to a dance party, a woman getting married, and a professor retiring from his university post as well as their friends and relatives are likely to be receptive to different types of voices, and a customized voice may manifest the intended meaning of the sender's message and make a substantial impact on the recipient. In this case, each eVite or greeting card may utilize a different voice, and the system or the sender can select an appropriate eVite or greeting card and the associated voice. As another example, a Jeopardy-type game may utilize different voices to present different questions depending on the contestants, the question categories, the prizes involved, and so on. Doing so may further engage the contestants and the participating audience and increase the entertainment value of the game. In this case, the game may package a variety of voices or synthesize appropriate voices on the spot based on information provided by users of the game as well as the nature and state of the game.

An example of a suitable data structure for providing a customized voice may be as follows:

| Profile ID | Nature | Audience | Category | Difficulty | Prize |
|---|---|---|---|---|---|
| 23 | Greeting card | Mother | Birthday | N/A | N/A |
| 25 | Game | Young male | Sports | High | $10,000 |

The system could employ a separate profile for each customized voice. In the first example (Profile ID 23), the customized voice is for a greeting card intended for a mother's birthday. Therefore, it may be a voice from a relatively older person with tones of respect and sweetness. In the second example (Profile ID 25), the customized voice is for a game with a young male contestant, where the current category is sports, the content is difficult, and the prize is large. As a result, it may be a male's voice that sounds enthusiastic yet prudent. The customization may be implemented for different levels of granularities, taking various factors into consideration. For example, additional information about the audience and the category can be incorporated to fine-tune each customized voice.

The targeted content determination module 640 may then select targeted content that matches the user's interaction style and suits the user's identity, mood and temperament. As one example, the targeted content determination module 640 may personalize the presentation of a targeted content by including a name of a user or a city where the user lives. As another example, when a user's inquiry is about the size of a pair of pants, the targeted content determination module 640 may remove children's sizes and men's clothes from the targeted content when the user's age is above a certain threshold and the user is determined to be a woman (where both relative age, and gender, can be determined automatically by the system based on the received utterance from the user). As yet another example, when the user sounds slow and authoritative and exhibits a keen yet careful attitude, the targeted content determination module 640 would converse, with the help of the text-to-speech module 330, with the user in a similar voice and presents detailed contents in an organized fashion to make the user feel engaged and guide the user through the process of learning and ultimately purchasing an advertised product. Presenting a customized voice may be helpful for facilitating communication in other, non-advertisement contexts, as discussed herein.

In addition, the targeted content determination module 640 determines how to deliver and present the targeted content based on the user data. As one example, the user data may indicate that a user performs a large number of activities online and thus may be an experienced internet user. As noted previously, such user data can be collected from a device operated by the user, including data transmitted as part of a user's online activities, such as the user's tweets and Facebook posts, and data tracking a user's online activities, such as Internet cookies and logs. The user data may also be collected directly from users through surveys or questionnaires. As a result, when the number of online activities performed by the user exceeds a threshold predetermined based on average user statistics or existing studies, for example, the targeted content determination module 640 may conclude that the user is an experienced internet user and present the targeted content in a flashy web page to the user.

As another example, since the user may indicate the user's profession and hobbies as well as general preferences and particular items of interest in different categories, the user data may reveal that a user is in a very busy profession or otherwise involved in a certain activity at the moment and would prefer a non-intrusive, succinct presentation of advertisement. Therefore, when the user data is tagged with certain keywords, such as "busy", "occupied", "focused" and "time-conscious", for example, the targeted content determination module 640 would choose to present the targeted content in easy-to-understand text or graphics via email.

The targeted content determination module transmits instructions for playing the targeted content to appropriate hardware and/or software modules or computing devices, which could be a device on which the voice-controlled advertisement platform 400 is deployed or other systems. For example, when the voice-controlled advertisement platform 400 operates on a mobile device, the targeted content determination module 640 may instruct the mobile device to launch a web browser to display the targeted content in a particular web page. In some implementations, the targeted content determination module 640 utilizes application programming interfaces (APIs) existing on the operating system of a client device (e.g., a user's mobile device) and functionality embodied in the operating system and other applications of the client device to automatically present targeted content to a user.

The targeted content determination module 640 saves the targeted content along with the inquiries to which they respond in the targeted content database 490. As discussed above, targeted content previously presented to a user could be used to help determine the subject matter of the user's future inquiries. Accordingly, when the voice-controlled advertisement platform is deployed on both a user device and a server computer, the targeted content determination module 640 may also predict additional content that may be of interest to the user and preload them to the user device to reduce the response time to the user. As is similar to the preloading of custom grammars or language models, the preloading of content may be performed periodically or at specific times. It may be performed when the load of the network between the server computer and the client device is relatively low, when additional content of interest become available, and so on. The preloaded content may then be stored in a local storage or in a cache on the client device to further expedite the utilization of the content.

In some implementations, the targeted content determination module 640 may classify inquiries from users and aggregate the targeted content presented in response to each class of inquiries. In some implementations, it may define user groups based on various attributes, such as age, location, profession, etc., and aggregate the targeted contents presented to each user group. The user groups may be defined by allowing a certain range for each of the attributes. For example, all the users of ages between eighteen and twenty-one or living within a five-mile radius may belong to the same user group. It may then determine which contents are most frequently delivered with respect to a class of inquiries and/or a user group and preload or cache those and related advertisements on select user devices to reduce the response time to any member in the particular user group. The most frequently delivered contents may be determined by considering the delivery frequencies within a certain timeframe above a certain percentile. It may also be determined by limiting the total volume of preloaded contents based on the capacity of the network connection between the server computer and the client device, the size of the cache on the client device, the number of inquiries received from the user within a certain timeframe, and so on. The contents may also be further classified into various categories, by the nature of the contents, the size of the contents, the manner of delivery, and so on. The determination of the most frequently delivered contents may be limited to contents in specific categories; otherwise, the preloading of contents in different categories may be performed according to different schedules.

As one example, user inquiries with respect to a specific scene of a movie may tend to be directed to the song playing in the background, and when users inquire about the song, they often are also interested in knowing more about the artist performing the song. Therefore, having delivered a large amount of content regarding the movie and the song to certain members of the user group corresponding to the intended audience of the movie or of the song, the targeted content determination module 640 may preload or cache advertisements of the artist, the movie or the song on the devices of other members of the user group. As another example, a video game series might have become very popular among a particular age group, and thus advertisements of any video game in the series have been extensively presented to users of that group. The targeted content determination module 640 may therefore preload or cache advertisements related to the video game series for all users of that particular age group on select user devices. It may also preload or cache related advertisements, such as those of related video game series and those of other items that are of common to that age group. As more advertisements are being delivered, the targeted content determination module 640 may iteratively re-determine which advertisements have been mostly accessed and push appropriate advertisements to select user devices according to a predetermined schedule.

Figure 9:
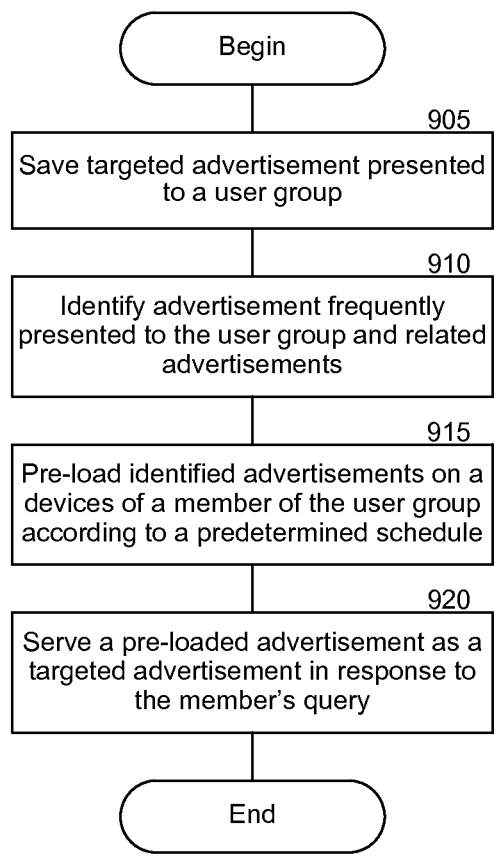
FIG. 9 is a flowchart illustrating an example process of preloading common responses.

FIG. 9 is a flowchart illustrating an example process of preloading common responses. At block 905, the targeted content determination module 640 saves all the targeted contents presented to users by user group, content category, inquiry type, or any other classification group in the targeted content database 480. Each piece of content, such as an advertisement, is associated with metadata for analysis purposes. An example of a generic data structure that can be used for a targeted advertisement can be as follows:

| ID | Category | Nature | Inquiry | User |
|---|---|---|---|---|
| 10 | Cars | Aston Martin | Inquiry 1 | User 1 |
| 20 | Food | Soufflé | Inquiry 20 | User 20 |

In the first example (ID 10), the targeted advertisement was previously delivered to a device of User 1, where information regarding the user can be found by following the link to that user's record in the user database 450. Furthermore, it was delivered in response to Inquiry 1, where information regarding the inquiry can be found by following the link to that inquiry's record also in the targeted content database 480. In addition, the targeted advertisement is classified into the cars category, as it is about an Aston Martin model manufactured in a certain year. Similarly, in the second example (ID 20), the targeted advertisement was previously delivered to a device of User 20 in response to Inquiry 20. It is classified into the food category, as it is about a certain type of soufflé made by a certain restaurant. For a particular user group, for example, the targeted content determination module 640 may identify the targeted advertisements from the information in the user field.

For a select classification group, at block 910, the targeted content determination module 640 identifies the advertisements that have been most commonly presented. Specifically, it keeps track of every delivery within a certain timeframe for each targeted advertisement. It may then rank the targeted advertisements in terms of delivery frequencies or determine whether each delivery frequency is sufficiently high based on a certain threshold. It may re-identify the advertisements that have been most commonly presented periodically, when a certain amount of targeted advertisements have been added to the database, and so on. The targeted content determination module 640 also identifies related advertisements on the same or similar subject matters. For example, if the targeted advertisement in the first example is selected for preloading, the targeted content determination module 640 may also select contents from the same car manufacturer, manufacturers of similar cars, manufactures of car products, such as windshield fluids, advertisers of other items that might be of interest to the same user group, and so on.

At block 915, the targeted content determination module 640 preloads the identified advertisements to appropriate devices. For example, if the select classification group is the group of users between ages 18 and 25, the appropriate devices would be the devices of these users on which the voice-controlled advertisement platform is deployed. As noted above, the preloading can be performed periodically or at select times. It may preload all the relevant content at once or spread the preloading over several scheduled times. The preloading is likely to reduce the time it takes to respond to the inquiries from the classification group overall. The preloaded data can be stored in a cache on each device to further reduce the response time.

At step 920, in response to a relevant inquiry received by a client device of a member of the select classification group, the client device may quickly present some of the preloaded advertisements to the user. The preloading may include, in addition to the targeted advertisements, the inquiries which have triggered the presentation of the targeted advertisements. In that case, when a new inquiry is one of those preloaded inquiries, the client device may immediately present the corresponding targeted advertisement. In the absence of the preloaded inquiries, the client device would wait for an instruction from the server computer of presenting a preloaded advertisement, instead of an actual advertisement when no preloading has occurred.

CONCLUSION

Those skilled in the art will appreciate that the actual implementation of a data storage area may take a variety of forms, and the phrase "data storage area" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the blocks may be rearranged, blocks may be performed in parallel, blocks may be omitted, or other blocks may be included.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more content elements; the coupling or connection between the content elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The content elements and acts of the various examples described above can be combined to provide further implementations of the invention. Some alternative implementations of the invention may include not only additional elements to those implementations noted above, but also may include fewer elements. The assignee's U.S. patent application Ser. No. 13/597,017, filed Aug. 28, 2012, and Ser. No. 13/749,798, filed Jan. 25, 2013, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

Using Environment and User Data to Deliver Advertisements Targeted to User Interests, e.g. Based on a Single Command 1. A method of determining interest elements of a user's voice inquiry captured by a recorder connected with a device and presenting a response to the user's voice inquiry, comprising:
    accepting personal data regarding the user;
    accepting the voice inquiry from the user;
    identifying possible interest elements related to the voice inquiry from at least one of—
    media content currently provided to the user by the device,
    media content from the user's environment, and
    media content previously provided to the user as responses to previous voice inquiries by the user;
    determining at least one interest element from the identified possible interest elements, and at least the accepted personal data or the user's previous voice inquiries; and
    presenting a response related to the determined interest element to the user's voice inquiry.

2. The method of claim 1, wherein the device is a television, a radio, a gaming console, a laptop, a tablet, a convertible laptop, a cellular phone, a wearable device, or a kiosk, and wherein presenting the response related to the determined interest element presents the response on the device.

3. The method of claim 1, wherein identifying possible interest elements includes media content consisting of a movie, a television program, a radio show, a song, a video, a game, or an advertisement, which is provided on the device.

4. The method of claim 1, further comprising determining the media content representing the user's environment based on information on the user's location.

5. The method of claim 1, wherein the personal data indicates the user's identity or preferences.

6. The method of claim 1, wherein the media content representing the user's environment captures scenes or sounds present in the environment.

7. A computer readable medium, excluding transitory propagating signals, storing instructions that, when executed by at least one computing device, cause the computing device to respond to a user's spoken request for additional information, comprising:
    in response to the received spoken request, identifying the user and accessing stored data associated with the user;
    obtaining environmental data associated with a current time and current location of the user;
    determining content to which the user is exposed at the current location and at the current time;
    analyzing the environmental data, the determined content, and the data associated with the user;
    identifying information having a highest probability of matching the user's request based on the analysis; and providing a communication to the user, wherein the communication includes the identified information or data permitting the user to access the identified information.

8. The computer readable medium of claim 7, wherein the environmental data includes GPS coordinates and a velocity of travel, wherein determining the content includes: identifying an advertisement displayed on a billboard near to the GPS coordinates and at the current time, and identifying a radio station and a current radio ad provided to the user at the current time.

Dynamic Embedded Recognizer and Preloading on Client Devices Grammars for Recognizing User Inquiries and Responses 1. A method of preloading advertisements or content by a server to a user's device, comprising:
saving or accessing advertisements or content presented to members of a user group to which the user belongs in response to inquiries made by the members of the user group;
identifying advertisements or content frequently presented to the members of the user group based on the saved or accessed advertisements or content;
preloading the identified advertisements or content on the user's device according to a schedule;
receiving a specific inquiry from the user's device;
determining a response to the specific inquiry; and
when the determined response contains one of the preloaded advertisements or content, instructing the user's device to present one of the preloaded advertisements or content to the user.

2. The method of claim 1, wherein when the determined response does not contain any of the preloaded advertisements or content, transmitting one or more advertisements or content contained in the response to the user's device.

3. The method of claim 1, wherein the schedule is periodic or whenever additional advertisements or content are identified.

4. The method of claim 1, wherein the preloading includes storing the identified advertisements or content in a cache on the user's device.

5. The method of claim 1, wherein the user group corresponds to an age range, a profession, or a geographical region.

6. A computer readable medium, excluding transitory propagating signals, storing instructions that, when executed by at least one computing device, cause the computing device to preload advertisements or content from a server to a user's device, comprising:
preloading from the server advertisements or content frequently presented to members of a user group to which the user belongs and related advertisements or content according to a schedule;
receiving a specific inquiry from the user; and
when the response to the specific inquiry contains or references one of the preloaded advertisements or content, presenting the one of the preloaded advertisements or content to the user.

7. A system of preloading grammars by a server to a user device, comprising:
means for saving grammars associated with inquires made by users;
means for identifying grammars frequently used to analyze inquiries made by the users;
means for preloading the identified grammars on the user device,
wherein the user device is configured to determine one of the preloaded, identified grammars to be used to analyze a specific inquiry received by a user; and
to apply the one grammar to the specific inquiry.

8. The method of claim 1, wherein the preloading is performed periodically or whenever additional grammars are identified, and wherein the grammars are associated with current advertising campaigns to which the user is or will be exposed.

Automatically Presenting Different User Experiences, Such as Customized Voices in Automated Communication Systems 1. A method of presenting customized voices by an automated communication system, comprising:
accepting information regarding an intended user of the automated communication system;
customizing or selecting one or more text-to-speech voices based on the accepted information; and
presenting, to the intended user, one or more audible communications for a predetermined task using the one or more customized voices.

2. The method of claim 1, wherein the automated communication system is a computerized invitation, a computerized greeting card, a computerized game, or a voice-controlled advertisement platform.

3. The method of claim 1, further comprising
storing multiple predetermined voices,
wherein customizing or selecting the one or more voices includes selecting the one or more voices from the stored voices.

4. The method of claim 1, further comprising
storing multiple predetermined voice components,
wherein the customizing or selecting the one or more voices includes synthesizing the one or more voices using one or more of the stored voice components.

5. The method of claim 1, wherein
the intended user interacts with the automated communication system, and
the one or more audible communications are presented in response to inquiries from the intended user.

6. The method of claim 5, further comprising customizing the one or more voices further based on a nature of an inquiry or a state of the task.

7. An automated communication system for presenting customized voices, comprising:
an accepting unit which accepts information regarding an intended user;
a customizing unit which customizes one or more voices based on the accepted information; and
a presenting unit which presents one or more audible speeches to the intended user using the one or more customized voices, wherein the one or more audible speeches are presented for a predetermined task.

The invention claimed is:
1. A method of preloading advertisements or content by a server to a user's mobile device over a network, the method comprising:
saving or accessing advertisements or content to be presented to members of a user group,
wherein the user belongs to the user group, and
wherein the advertisements or content are based on audible inquiries made by the members of the user group and environment data, media content, or a combination thereof characterizing surroundings of the members contemporaneous with the audible inquiries;

determining a presentation trigger based on the audible inquiries and the environment data, the media content, or a combination thereof,
  wherein the presentation trigger is for initiating presentation of the advertisements or content;
identifying advertisements or content frequently presented to the members of the user group based on the saved or accessed advertisements or content;
sending the identified advertisements or content and the associated presentation trigger to the user's device for caching and preloading,
  wherein the identified advertisements or content include audible advertisements or content to be presented to the user;
receiving a specific inquiry along with current environment data, current media content, or a combination thereof from the user's device,
  wherein the current environment data, current media content, or a combination thereof characterizes surroundings of the user's device at a time of the specific inquiring;
determining a response to the specific inquiry and the current environment data, the current media content, or a combination thereof based on the presentation trigger; and
when the determined response contains one of the preloaded advertisements or content, instructing the user's device to present one of the preloaded advertisements or content to the user to be listened to by the user.

2. The method of claim 1, wherein when the determined response does not contain any of the preloaded advertisements or content, transmitting one or more advertisements or content contained in the response to the user's device.

3. The method of claim 1, wherein the sending is performed periodically, based on an instruction from the user, or whenever additional advertisements or content are identified.

4. The method of claim 1, wherein the user group corresponds to an age range, a profession, or a geographical region.

5. The method of claim 1, wherein the inquiries made by the members of the user group and the specific inquiry are each a spoken request or instruction.

6. A computer readable medium, excluding transitory propagating signals, storing instructions that, when executed by at least one mobile computing device, cause the computing device to preload advertisements from a server, comprising:
  preloading, on the mobile computing device and from the server, advertisements frequently presented to members of a user group to which the user belongs;
  preloading, on the mobile computing device and from the server, presentation triggers for initiating presentation of the advertisements,
    wherein each of the presentation triggers characterize audible inquiries made by the members of the user group and environment data, media content, or a combination thereof characterizing surroundings of the members contemporaneous with the audible inquiries;
  receiving, at the mobile computing device, a specific spoken inquiry from the user;
  determining current environment data, current media content, or a combination thereof characterizing surroundings of the mobile computing device at a time of the specific spoken inquiry; and
  when the response to the specific spoken inquiry and the current environment data, the current media content, or a combination thereof matches one of the presentations triggers for one of the preloaded advertisements, presenting, on the mobile computing device, the one of the preloaded advertisements to the user,
    wherein the preloaded advertisements are audible advertisements to be heard by the user.

7. The computer readable medium of claim 6, wherein the preloading includes storing the advertisements from the server in a cache on the mobile computing device.

8. The computer readable medium of claim 6, wherein when the response does not contain or reference any of the preloaded advertisements, receiving one or more advertisements contained or referenced in the response from the server.

9. The computer readable medium of claim 6, wherein the preloading is performed periodically, based on an instruction from the user, or when additional advertisements which are frequently presented to the members of the user group are identified by the server.

10. The computer readable medium of claim 6, wherein the user group corresponds to an age range, a profession, or a geographical region.

11. The computer readable medium of claim 6, wherein the specific inquiry is a spoken request or instruction.

12. At least one non-transitory computer-readable medium, carrying instruction, which when executed by a user's mobile device, performs a method of preloading advertisements or content from a server, the method comprising:
  saving or accessing advertisements or content to be presented to members of a user group,
    wherein the user belongs to the user group, and
    wherein the advertisements or content are based on audible inquiries made by the members of the user group and environment data, media content, or a combination thereof characterizing surroundings of the members contemporaneous with the audible inquiries;
  determining a presentation trigger based on the audible inquiries and the environment data, the media content, or a combination thereof,
    wherein the presentation trigger is for initiating presentation of the advertisements or content;
  identifying advertisements or content frequently presented to the members of the user group based on the saved or accessed advertisements or content;
  sending the identified advertisements or content and the associated presentation trigger to the user's device for caching and preloading,
    wherein the identified advertisements or content include audible advertisements or content to be presented to the user;
  receiving a specific inquiry along with current environment data, current media content, or a combination thereof from the user's device,
    wherein the current environment data, current media content, or a combination thereof characterizes surroundings of the user's device at a time of the specific inquiry;
  determining a response to the specific inquiry and the current environment data, the current media content, or a combination thereof based on the presentation trigger; and
  when the determined response contains one of the preloaded advertisements or content, instructing the user's device to present one of the preloaded advertisements or content to the user to be listened to by the user.

13. The non-transitory computer-readable medium of claim 12, wherein when the determined response does not contain any of the preloaded advertisements or content, transmitting one or more advertisements or content contained in the response to the user's device.

14. The non-transitory computer-readable medium of claim 12, wherein the sending is performed periodically, based on an instruction from the user, or when additional advertisements or content are identified.

15. The non-transitory computer-readable medium of claim 12, wherein the user group corresponds to an age range, a profession, or a geographical region and wherein the inquiries made by the members of the user group and the specific inquiry are each a spoken request or instruction.

16. A computer-executable method to preload advertisements from a server, the method comprising:
   preloading, on the mobile computing device and from the server, advertisements frequently presented to members of a user group to which the user belongs;
   preloading, on the mobile computing device and from the server, presentation triggers for initiating presentation of the advertisements,
      wherein each of the presentation triggers characterize audible inquiries made by the members of the user group and environment data, media content, or a combination thereof characterizing surroundings of the members contemporaneous with the audible inquiries;
   receiving, at the mobile computing device, a specific spoken inquiry from the user;
   determining current environment data, current media content, or a combination thereof characterizing surroundings of the mobile computing device at a time of the specific spoken inquiry; and
   when the response to the specific spoken inquiry and the current environment data, the current media content, or a combination thereof matches one of the presentations triggers for one of the preloaded advertisements, presenting, on the mobile computing device, the one of the preloaded advertisements to the user,
      wherein the preloaded advertisements are audible advertisements to be heard by the user.

17. The method of claim 16, wherein the preloading includes storing the advertisements from the server in a cache on the mobile computing device.

18. The method of claim 16, wherein when the response does not contain or reference any of the preloaded advertisements, receiving one or more advertisements contained or referenced in the response from the server.

19. The method of claim 16, wherein the preloading is performed periodically, based on an instruction from the user, or when additional advertisements which are frequently presented to the members of the user group are identified by the server.

20. The method of claim 16, wherein the user group corresponds to an age range, a profession, or a geographical region, and wherein the specific inquiry is a spoken request or instruction.

* * * * *